(12) United States Patent
Ono

(10) Patent No.: US 12,460,383 B2
(45) Date of Patent: Nov. 4, 2025

(54) WORK MACHINE AND INFORMATION PROCESSING APPARATUS

(71) Applicant: SUMITOMO HEAVY INDUSTRIES, LTD., Tokyo (JP)

(72) Inventor: Tetsuji Ono, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 870 days.

(21) Appl. No.: 17/034,567

(22) Filed: Sep. 28, 2020

(65) Prior Publication Data

US 2021/0010239 A1 Jan. 14, 2021

Related U.S. Application Data

(63) Continuation of application No. PCT/JP2019/014392, filed on Mar. 29, 2019.

(30) Foreign Application Priority Data

Mar. 30, 2018 (JP) .................. 2018-070360

(51) Int. Cl.
*E02F 9/22* (2006.01)
*E02F 3/32* (2006.01)
(Continued)

(52) U.S. Cl.
CPC .............. *E02F 9/2203* (2013.01); *E02F 3/32* (2013.01); *E02F 3/437* (2013.01); *E02F 3/439* (2013.01);
(Continued)

(58) Field of Classification Search
CPC ..................................................... E02F 9/2203
See application file for complete search history.

(56) References Cited

U.S. PATENT DOCUMENTS

| 5,704,429 A | 1/1998 | Lee et al. |
| 5,933,346 A | 8/1999 | Brabec et al. |

(Continued)

FOREIGN PATENT DOCUMENTS

| DE | 102014212480 | 12/2015 |
| EP | 0650544 | 6/1998 |

(Continued)

OTHER PUBLICATIONS

Google Machine Translation of JP2000064336A to Kashima 1998.*
International Search Report for PCT/JP2019/014392 mailed on Jun. 25, 2019.

*Primary Examiner* — Jean Paul Cass
(74) *Attorney, Agent, or Firm* — IPUSA, PLLC

(57) ABSTRACT

A work machine includes a plurality of actuators and an operation receiving unit for receiving a plurality of operation inputs concerning the plurality of actuators. In a first mode, one actuator among the plurality of actuators operates by one operation input among the plurality of operation inputs. In a second mode, two or more actuators among the plurality of actuators operate by the one operation input. In the second mode, in response to another operation input different from the one operation input among the plurality of operation inputs, an actuator other than the two or more actuators among the plurality of actuators is operated, or a parameter concerning the actuator that operates by the one operation input among the plurality of actuators is adjusted.

3 Claims, 20 Drawing Sheets

(51) Int. Cl.
*E02F 3/43* (2006.01)
*E02F 9/02* (2006.01)
*E02F 9/20* (2006.01)

(52) U.S. Cl.
CPC .......... *E02F 9/2012* (2013.01); *E02F 9/2041* (2013.01); *E02F 9/2271* (2013.01); *E02F 9/02* (2013.01); *E02F 9/2285* (2013.01); *E02F 9/2292* (2013.01); *E02F 9/2296* (2013.01)

(56) References Cited

U.S. PATENT DOCUMENTS

| | | | | |
|---|---|---|---|---|
| 6,363,632 | B1 * | 4/2002 | Stentz | E02F 9/24 701/50 |
| 7,210,890 | B2 * | 5/2007 | Curotto | B65F 3/041 414/501 |
| 9,915,054 | B2 | 3/2018 | Wu | |
| 11,629,479 | B2 * | 4/2023 | Nakajima | E02F 9/2285 60/468 |
| 2006/0162543 | A1 * | 7/2006 | Abe | E02F 9/2239 91/418 |
| 2009/0007772 | A1 * | 1/2009 | Yamamoto | E02F 9/2292 91/446 |
| 2017/0089033 | A1 | 3/2017 | Matsuyama et al. | |
| 2017/0121930 | A1 * | 5/2017 | Kitajima | E02F 9/2296 |
| 2021/0332558 | A1 * | 10/2021 | Lensing | E02F 9/2235 |
| 2022/0136204 | A1 * | 5/2022 | Kushner | E02F 3/422 37/403 |

FOREIGN PATENT DOCUMENTS

| | | |
|---|---|---|
| JP | H09-268602 | 10/1997 |
| JP | H10-088608 | 4/1998 |
| JP | 2000-064336 | 2/2000 |
| JP | 2011-006178 | 1/2011 |
| JP | 2017-075529 | 4/2017 |
| JP | 2017-210816 | 11/2017 |

* cited by examiner

LEFT LEVER          RIGHT LEVER

| OPERATING LEVER | LEFT LEVER | RIGHT LEVER |
|---|---|---|
| VERTICAL OPERATION | DRIVE ARM | DRIVE BOOM |
| HORIZONTAL OPERATION | SWIVEL | DRIVE BECKET |

BECKET AUTOMATIC CONTROL

■▶ : MANUAL
▷ : AUTOMATIC

DESIGN PLANE

OFFSET AMOUNT

| OPERATING LEVER | LEFT LEVER | RIGHT LEVER |
|---|---|---|
| VERTICAL OPERATION | DRIVE ARM (+ CAUSE BOOM TO FOLLOW) | SET OFFSET AMOUNT FROM DESIGN PLANE |
| HORIZONTAL OPERATION | SWIVEL | DRIVE BECKET |

| OPERATING LEVER | LEFT LEVER | RIGHT LEVER |
|---|---|---|
| VERTICAL OPERATION | DRIVE ARM (+ CAUSE BOOM TO FOLLOW) | SET OFFSET AMOUNT FROM DESIGN PLANE |
| HORIZONTAL OPERATION | SWIVEL | DRIVING SPEED |

| OPERATING LEVER | LEFT LEVER | RIGHT LEVER |
|---|---|---|
| VERTICAL OPERATION | DRIVE ARM (+ CAUSE BOOM TO FOLLOW) | SET OFFSET AMOUNT FROM DESIGN PLANE |
| HORIZONTAL OPERATION | SWIVEL | PRESSING FORCE |

FIG.12

| OPERATING LEVER | LEFT LEVER | RIGHT LEVER |
|---|---|---|
| VERTICAL OPERATION | DRIVE ARM (+ CAUSE BOOM TO FOLLOW) | ADJUST OPERATION PARAMETER FOR WORKING PORTION |
| HORIZONTAL OPERATION | SWIVEL (+ FOLLOWED BY LIFTING BOOM) | DRIVE BECKET (+ FOLLOWED BY OPENING ARM) |

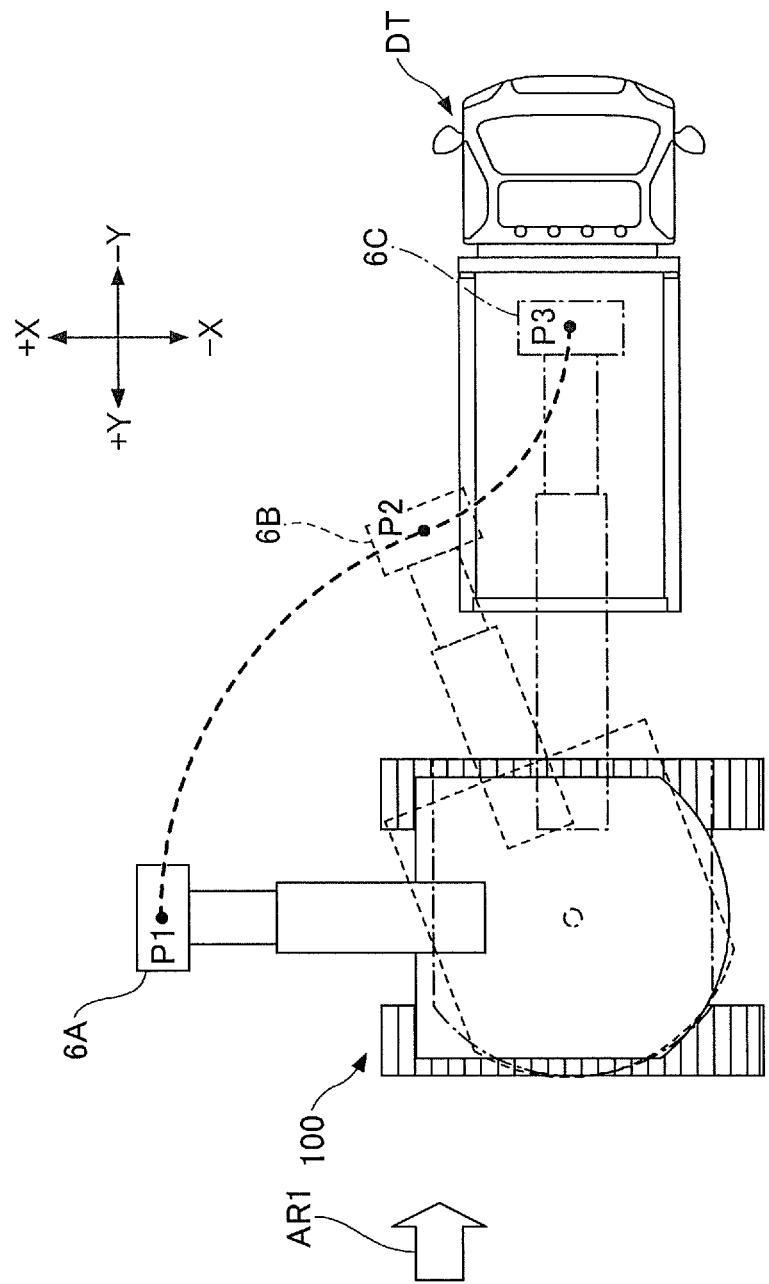

FIG.14

| OPERATING LEVER | LEFT LEVER | | RIGHT LEVER |
|---|---|---|---|
| | FIRST DIRECTION | SECOND DIRECTION | |
| VERTICAL OPERATION | ⟨FORWARD⟩ DRIVE ARM (+ FOLLOWED BY OPENING BECKET) | ⟨BACKWARD⟩ DRIVE ARM (+ CAUSE BOOM TO FOLLOW) | ADJUST OPERATION PARAMETER FOR WORKING PORTION FOR A TIME OF DRIVING ARM |
| HORIZONTAL OPERATION | ⟨LEFTWARD⟩ SWIVEL (+ FOLLOWED BY LIFTING BOOM) | ⟨RIGHTWARD⟩ SWIVEL (+ FOLLOWED BY LOWERING BOOM) | ADJUST OPERATION PARAMETER FOR WORKING PORTION FOR A TIME OF SWIVELING |

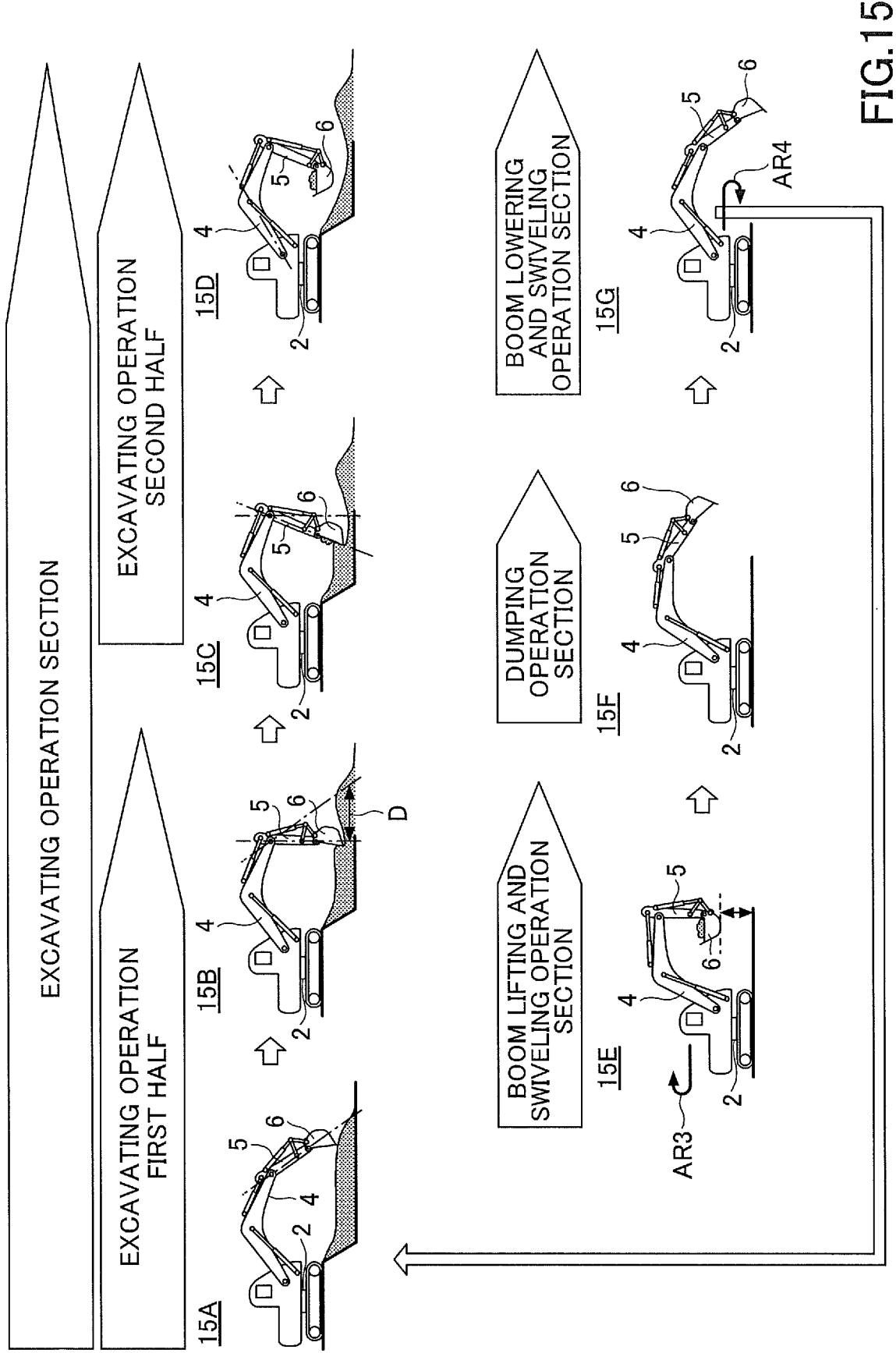

WORK MACHINE AND INFORMATION PROCESSING APPARATUS

RELATED APPLICATIONS

The present application is a continuation of International Application No. PCT/JP2019/014392, filed Mar. 29, 2019, which claims priority to Japanese Patent Application No. 2018-070360, filed Mar. 30, 2018. The contents of these applications are incorporated herein by reference in their entirety.

BACKGROUND ART

Technical Field

The present invention relates to a work machine and an information processing apparatus.

Description of Related Art

For example, a work machine capable of operating a plurality of actuators with one operation input is known.

In the known excavator, operations of a boom and so forth are automatically controlled by only an operator's lever operation for an arm, and an excavation operation, leveling operation, or the like can be implemented by an attachment so as to move a tip portion of a bucket along a predetermined design plane or the like.

SUMMARY

In one embodiment of the present invention, a work machine is provided. The work machine includes: a plurality of actuators; and an operation receiving unit configured to receive a plurality of operation inputs concerning the plurality of actuators. In a first mode, one actuator among the plurality of actuators operates by one operation input among the plurality of operation inputs, and, in a second mode, two or more actuators among the plurality of actuators operate by the one operation input. In the second mode, in response to another operation input different from the one operation input among the plurality of operation inputs, an actuator other than the two or more actuators among the plurality of actuators is operated, or a parameter concerning the actuator that operates by the one operation input among the plurality of actuators is adjusted.

BRIEF DESCRIPTION OF THE DRAWINGS

FIG. 12 is a diagram for illustrating a fourth example of an allocation of a different operational object to a lever device corresponding to an actuator not required to be manually operated when the machine control function is activated.

FIG. 13A is a diagram for illustrating the fourth example of a working state of the excavator with the machine control function.

FIG. 14 is a diagram for illustrating a fifth example of an allocation of a different operational object to a lever device corresponding to an actuator not required to be manually operated when the machine control function is activated.

FIG. 15 is a diagram for illustrating the fifth example of a working state of the excavator with the machine control function.

DETAILED DESCRIPTION

In the related art described above, while a function of operating a plurality of actuators with one operation input is activated, operation inputs for operating the a plurality of actuators individually are deactivated. As a result, operation inputs for operating the plurality of actuators individually are not required. In this regard, it is desirable that, when a function for operating the plurality of actuators with one operation input is activated, operation inputs for operating the plurality of actuators individually can be effectively utilized.

Therefore, it is desirable to provide a work machine capable of effectively utilizing operation inputs for operating a plurality of actuators individually when a function for operating the plurality of actuators with one operation input is activated.

In another embodiment of the present invention, an information processing apparatus is provided. The information processing apparatus may set an operational object of the another operation input of a case where the work machine is in the second mode, or display the operational object set contents.

According to the embodiments of the present invention, a work machine can be provided where when a function of operating a plurality of actuators with one operation input is activated, operation inputs for operating the plurality of actuators individually can be effectively utilized.

Hereinafter, the embodiments of the present invention will be described with reference to the drawings.

[Overview of Excavator]

Figure 1A:
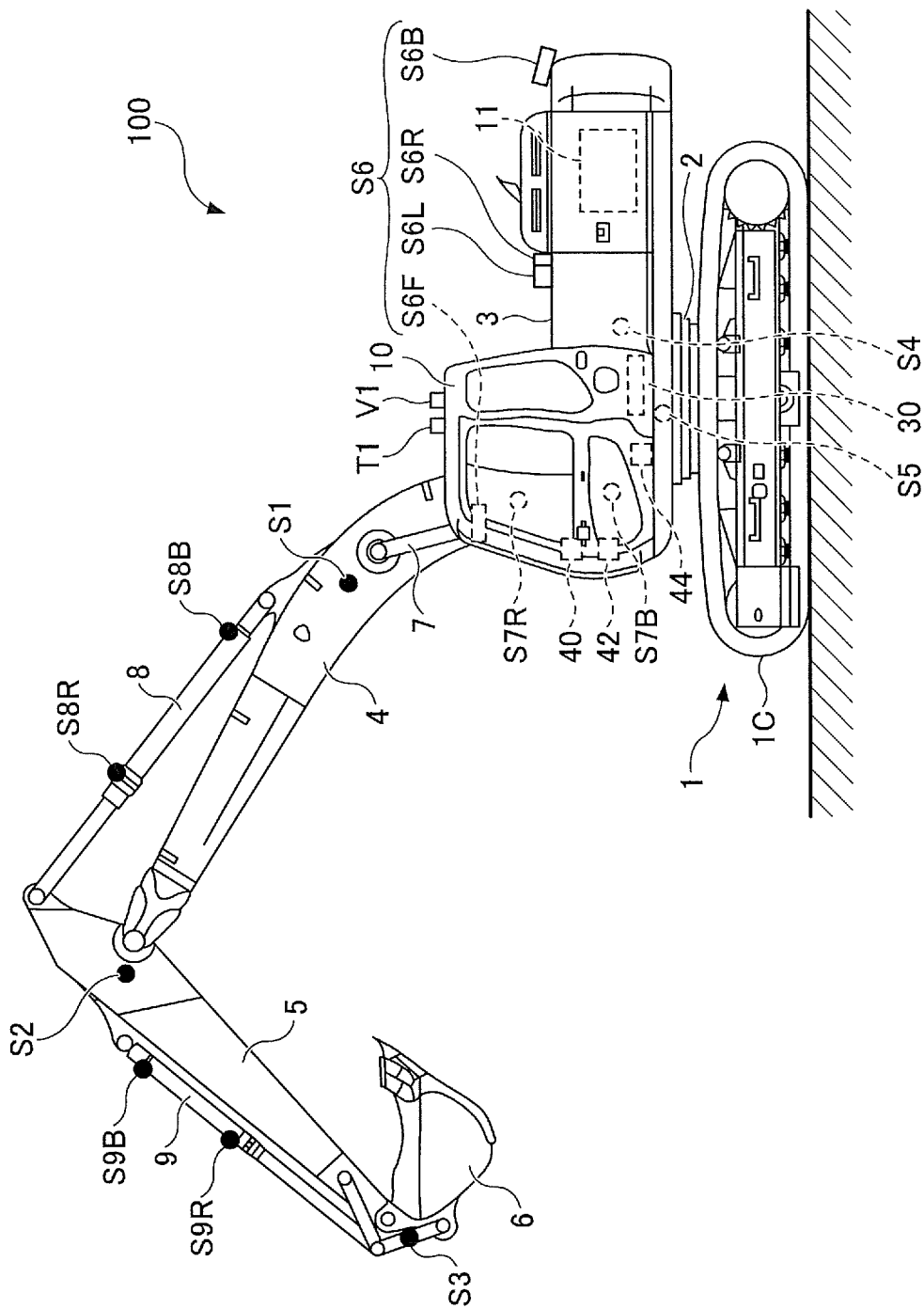
FIG. 1A is a side view of an excavator.
Figure 1B:
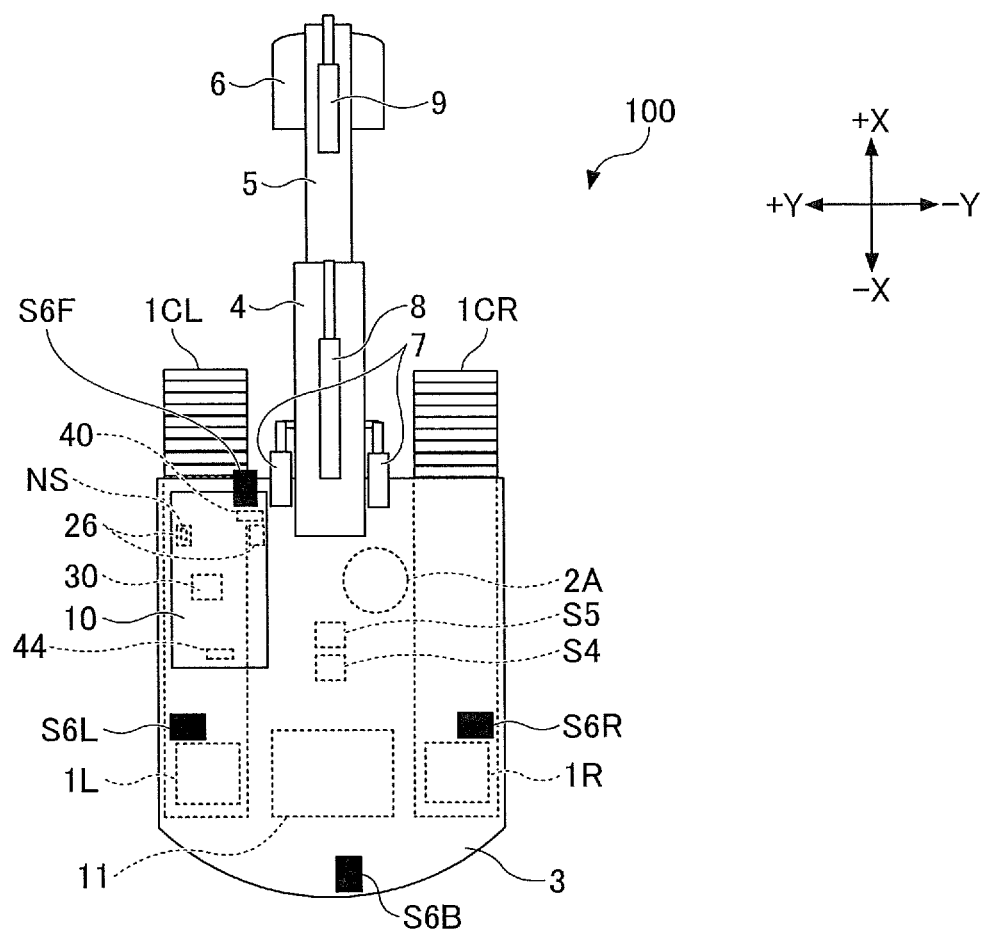
FIG. 1B is a top view of the excavator.

First, an outline of an excavator 100 according to an embodiment will be described with reference to FIG. 1 (FIGS. 1A and 1B).

FIGS. 1A and 1B are side and top views of the excavator 100 according to the present embodiment.

The excavator 100 according to the present embodiment includes a lower traveling body 1, an upper swiveling body 3 that is mounted on the lower traveling body 1 in a swivelable manner through a swiveling mechanism 2, as well as a boom 4, an arm 5, and a bucket 6 as attachments (working devices), and a cabin 10.

The lower traveling body 1 (an example of a traveling body) includes, for example, a pair of left and right crawlers 1C (one crawler 1CL on the left side and the other crawler 1CR on the right side), and each crawler 1CL or 1CR is hydraulically driven by traveling hydraulic motors 1L and 1R, to drive the excavator 100.

The upper swiveling body 3 is driven by a swiveling hydraulic motor 2A and swivels freely with respect to the lower traveling body 1.

The boom 4 is mounted at the front center of the upper swiveling body 3 in a manner of being able to derrick by rotating around an axis, the arm 5 is vertically-rotatably mounted at the tip of the boom 4, and the bucket 6 is vertically-rotatably mounted at the tip of the arm 5.

The bucket 6 (an example of an end attachment) is mounted at the tip of the arm 5 in a suitably replaceable manner depending upon a working type of the excavator 100. Therefore, the bucket 6 may be replaced with a different type of a bucket, such as a large bucket, a bucket for a slope, a dredger bucket, or the like. The bucket 6 may also be replaced by a different type of an end attachment, such as an agitator, a breaker, or the like.

The boom 4, arm 5, and bucket 6 (each being an example of a link unit) are hydraulically driven by a boom cylinder 7, an arm cylinder 8, and a bucket cylinder 9, respectively, as hydraulic actuators.

The cabin 10 is a cockpit in which an operator boards and is mounted at a front left side of the upper swiveling body 3.

[Configuration of Excavator]

Next, a specific configuration of the excavator 100 will be described with reference to FIG. 2, in addition to FIGS. 1A and 1B.

Figure 2:
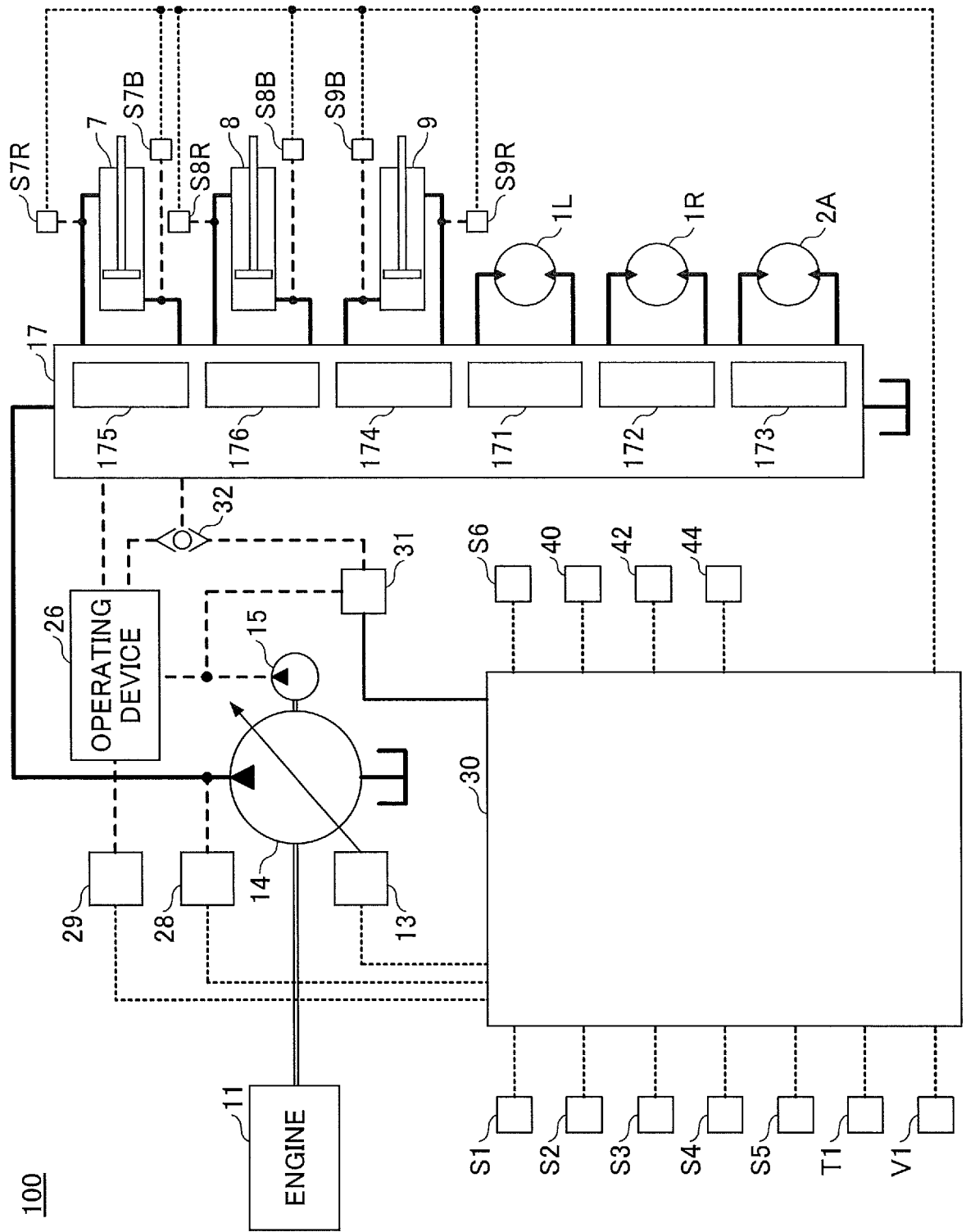
FIG. 2 is a block diagram for illustrating an example of a configuration of the excavator.

FIG. 2 is a block diagram for illustrating an example of a configuration of the excavator 100 according to the present embodiment.

In the figure, a mechanical power line is represented by a double line, a high-pressure hydraulic line by a solid line, a pilot line by a dashed line, and an electric drive and control line by a dotted line. The same applies to FIGS. 3 and 4.

<Hydraulic Drive System of Excavator>

A hydraulic drive system of the excavator 100 according to the present embodiment includes a plurality of hydraulic actuators (examples of actuators) that hydraulically drive corresponding to-be-driven elements, such as the lower traveling body 1, the upper swiveling body 3, the boom 4, the arm 5, and the bucket 6, as described above. Specifically, the hydraulic actuators include the traveling hydraulic motors 1L and 1R, swiveling hydraulic motor 2A, boom cylinder 7, arm cylinder 8, and bucket cylinder 9 (each of which is an example of an actuator). The hydraulic drive system for driving the hydraulic actuators of the excavator 100 according to the present embodiment includes an engine 11, regulators 13, main pumps 14, and control valves 17.

The engine 11 is a main power source in the hydraulic drive system and is mounted, for example, at the rear of the upper swiveling body 3. Specifically, the engine 11 rotates at a predetermined target speed under direct or indirect control of the controller 30 to drive the main pumps 14 and pilot pumps 15. The engine 11 is, for example, a diesel engine fueled with diesel oil.

The regulators 13 control the discharges of the main pumps 14. For example, the regulator 13 adjusts angles (tilt angles) of swash plates of the main pumps 14 in response to control commands from the controller 30. The regulators 13 includes regulators 13L and 13R, for example, as will be described.

The main pumps 14 (examples of hydraulic pumps) are mounted, like the engine 11, at the rear of the upper swiveling body 3 to supply hydraulic oil to the control valves 17 through high pressure hydraulic lines 16. The main pumps 14 are driven by the engine 11 as described above. The main pumps 14 are, for example, variable capacity hydraulic pumps, and, as described above, under the control of the controller 30; the regulators 13 adjust the tilt angles of the swash plates, thereby adjusting the stroke lengths of pistons and controlling the discharge flow rates (discharge pressures). The main pumps 14 include main pumps 14L and 14R, for example, as will be described.

The control valves 17, for example, are mounted at the center of the upper swiveling body 3 and are hydraulic control devices which control the hydraulic drive system in response to an operation by the operator of the operating device 26. As described above, the control valves 17 are connected to the main pumps 14 through the high pressure hydraulic lines 16, and selectively supply hydraulic oil supplied from the main pumps 14 to the hydraulic actuators (the traveling hydraulic motors 1L and 1R, the swiveling hydraulic motor 2A, the boom cylinder 7, the arm cylinder 8, and the bucket cylinder 9), depending on operated states (for example, operating amounts, operating directions, or the like) of the operating device 26. Specifically, the control valves 17 include control valves 171-176 for controlling the flow rates and flow directions of hydraulic oil supplied from the main pumps 14 to the hydraulic actuators. A control valve 171 corresponds to the travelling hydraulic motor 1L, a control valve 172 corresponds to the travelling hydraulic motor 1R, a control valve 173 corresponds to the swiveling hydraulic motor 2A, a control valve 174 corresponds to the bucket cylinder 9, control valves 175 correspond to the boom cylinder 7, and control valves 176 correspond to the arm cylinder 8. The control valves 175 include control valves 175L and 175R, for example, as will be described, and the control valves 176 include control valves 176L and 176R, for example, as will be described. The control valves 171-176 will be described in detail (see FIG. 3).

The excavator 100 may be remotely operated. In this case, the control valves 17 control the hydraulic drive system in response to signal (hereinafter, "remote control signals") relating to operations of actuators (hydraulic actuators) received from an external apparatus through a communication device T1 (an example of an operation receiving unit) provided in the excavator 100. The remote control signals indicate the actuators to be operated and the contents of the remote control (for example, operating directions and operating amounts) relating to the actuators to be operated. An operator of remote control (hereinafter, referred to as a "remote operator") remotely controls the actuators of the excavator 100 from outside of the cabin 10 of the excavator 100 through an operating device for remote control. The remote operator may operate the excavator 100 from a position of being able to directly see the excavator or from a position of not being able to directly see the excavator 100. In the latter case, the remote operator may perform remote control while viewing surrounding image information captured by the excavator 100, for example, displayed on a display or the like. For example, the operating device for remote control (hereinafter, for convenience, a "remote operating device") may be similar in configuration to the operating device 26 of the excavator 109. The remote operating device may, for example, be configured to operate the upper swiveling body 3 and the attachments (the boom 4, the arm 5, and the bucket 6) separately with two lever units operable vertically (forward or backward) and horizontally (leftward or rightward). The remote operating device may also be, for example, in a completely different form from the operating device 26 of the excavator 100 (for example, in a form of a controller (game pad) for a computer game, a joystick, or the like). That is, the remote operating device may be configured with any type of operating members provided that an operating amount and an operating direction (two directions) for each of the plurality of actuators of the excavator 100 can be output. For example, the controller 30 outputs a control command corresponding to the remote control signal to a proportional valve 31, which will be described, which is located in a hydraulic line (pilot line) connecting the pilot pump 15 and the control valve 17. This allows the proportional valve 31 to apply a pilot pressure corresponding to the control command, that is, a pilot pressure corresponding to the contents of the remote control provided in the remote control signal, to the control valve 17 via a shuttle valve 32, which will be described later. Therefore, the control valve 17 can implement the operation of the hydraulic actuator according to the contents of the remote control indicated by the remote control signal.

<Operation System of Excavator>

An operating system of the excavator 100 according to the present embodiment includes the pilot pumps 15 and the operating device 26. The operation system of the excavator 100 includes the shuttle valves 32 as configurations related to a machine control function (also referred to as a semi-automatic operation function) implemented by the controller 30, which will be described later.

The pilot pumps 15 are mounted, for example, at the rear of the upper swiveling body 3 and provide pilot pressures to the operating device 26 via pilot lines. The pilot pumps 15 are, for example, constant volume hydraulic pumps driven by the engine 11 as described above.

The operating device 26 (an example of an operation receiving unit) is provided near the cockpit in the cabin 10 and is an operation input unit for an operator to operate various to-be-driven elements (working bodies such as the lower traveling body 1, the upper swiveling body 3, the boom 4, the arm 5, and the bucket 6). In other words, the operating device 26 is an operation input unit for the operator to operate the hydraulic actuators (that is, the traveling hydraulic motors 1L and 1R, the swiveling hydraulic motor 2A, the boom cylinder 7, the arm cylinder 8, the bucket cylinder 9, and so forth) driving the respective to-be-driven elements. The operating device 26 is connected to each of the control valves 17 either directly through its secondary pilot lines or indirectly through shuttle valves 32 that will be described provided in the secondary pilot lines. Thus, the control valve 17 may be provided with a pilot pressure corresponding to the operated state of the operating device 26 for the lower traveling body 1, the upper swiveling body 3, the boom 4, the arm 5, or the bucket 6. Thus, the control valve 17 can drive the corresponding hydraulic actuator according to the operated state of the operating device 26. The operating device 26 includes lever devices 26A-26D for operating the boom 4 (the boom cylinder 7), the arm 5 (the arm cylinder 8), the bucket 6 (the bucket cylinder 9), and the upper swiveling body 3 (the swiveling hydraulic motor 2A), respectively, as will be described (see FIGS. 4A-4D). The operating device 26 includes, for example, a pedal device or a lever device for operating each of the left and right sections of the lower traveling body 1 (the traveling hydraulic motors 1L and 1R).

The shuttle valve 32 has two inlet ports and one outlet port and causes the outlet port to output hydraulic oil having the higher one of the pilot pressures input to the two inlet ports. The shuttle valve 32 has one of the two inlet ports connected to the operating device 26 and the other to the proportional valve 31. The outlet port of the shuttle valve 32 is connected through the pilot line to the pilot port of the corresponding control valve among the control valves 17 (see FIGS. 4A-4D for details). Thus, the shuttle valve 32 can cause the higher one of the pilot pressures generated by the operating device 26 and the pilot pressure generated by the proportional valve 31 to be applied to the pilot port of the corresponding control valve. That is, the controller 30, which will be described later, outputs a pilot pressure higher than a pilot pressure of the secondary side output from the proportional valve 31 from the operating device 26, so that the corresponding control valve can be controlled and the operation of the attachment can be controlled independent of the operation of the operating device 26 performed by the operator. The shuttle valves 32 include shuttle valves 32AL, 32AR, 32BL, 32BR, 32CL, and 32CR, for example, as will be described.

<Control System of Excavator>

The control system of the excavator 100 according to the present embodiment includes the controller 30, a discharge pressure sensor 28, operating pressure sensors 29, a display device 40, an input device 42, and a sound output device 44. The controller 30 includes a proportional valve 31, a boom angle sensor S1, an arm angle sensor S2, a bucket angle sensor S3, a body tilt sensor S4, a swiveled state sensor S5, image capturing devices S6, a boom rod pressure sensor S7R, a boom bottom pressure sensor S7B, an arm rod pressure sensor S8R, an arm bottom pressure sensor S8B, a bucket rod pressure sensor S9R, a bucket bottom pressure sensor S9B, a positioning device V1, and the communication device T1 as configurations related to the machine control function to be described later.

The controller 30 performs various controls with respect to the excavator 100. The controller 30 may implement its functions in any hardware or a combination of hardware and software. For example, the controller 30 is configured to include, as a main element, a microcomputer including a processor such as a CPU (Central Processing Unit), a memory device such as RAM (Random Access Memory), a non-volatile auxiliary storage device such as ROM (Read-Only Memory), and an interface device for various inputs and outputs. The controller 30 implements various functions by executing various programs stored in an auxiliary storage device or the like by the CPU.

For example, the controller 30 outputs a control command to the regulator 13 as needed to change the discharge of the main pump 14.

For example, the controller 30 sets a target speed based on a working mode (also referred to as an operation mode) preset by a predetermined operation of the operator or the like and performs drive control for constant rotation of the engine 11.

For example, the controller 30 controls the regulator 13 and adjusts the discharge of the main pump 14 based on a pilot pressure detection value, corresponding to an operated state of the operating device 26 for a corresponding one of various to-be-driven elements (that is, various hydraulic actuators), input from the operating pressure sensor 29.

For example, the controller 30 implements the machine control function to automatically assist the operator in operating a to-be-driven element, such as the lower traveling body 1, the upper swiveling body 3, or an attachment (the boom 4, the arm 5, or the bucket 6). Specifically, the controller 30 may automatically operate a plurality of to-be-driven elements (i.e., a plurality of hydraulic actuators) so that a predetermined working portion (for example, a tooth tip, a back face, or the like) of the bucket 6 moves along a predetermined target track in response to an operation input from the operating device 26 or an operation input (a remote control signal) corresponding to remote control from the external apparatus.

The controller 30 may automatically operate at least one of the boom 4 and the bucket 6 so as to cause a predetermined target design plane (also referred to as a target construction plane) (hereinafter simply referred to as a "design plane") to be the same as the position of a predetermined working portion of the bucket 6, for example, while operation of the arm 5 is being performed. In this case, operation of the arm 5 may be an operation of the arm 5 by the operator through the operating device 26 or remote control of the arm 5 corresponding to a remote control signal received from the external apparatus. The controller 30 may also automatically operate the arm 5, independent pf the operated state with respect to the arm 5. That is, the controller 30 may use, as a trigger, the operator's operation of the operating device 26 or remote control corresponding to a remote control signal received from the external apparatus to cause a predefined operation to be performed by an attachment or the like. Thus, the controller 30 may implement the machine control function that operates not only the arm 5 but also at least one of the boom 4 and the bucket 6 according to an operation with respect to the arm 5.

The machine control function may be implemented, for example, as a result of a predetermined knob switch (hereinafter, "MC (Machine Control) switch") NS located at the tip of any one of the levers 26L and 26R, being discussed below, of the lever devices 26A-26D included in the input device 42, being operated. That is, when the MC switch NS is operated, the excavator 100 may switch from a normal control mode (an example of a first mode) in which the machine control function is deactivated to a control mode (hereinafter, "machine control mode") (an example of a second mode) in which the machine control function is activated.

More specifically, the controller 30 acquires information from the boom angle sensor S1, the arm angle sensor S2, the bucket angle sensor S3, the body tilt sensor S4, the swiveled state sensor S5, the image capturing device S6, the positioning device V1, the communication device T1, and the input device 42. The controller 30 also calculates the distance between the bucket 6 and the design plane, for example, based on the acquired information. The controller 30 can automatically operate the hydraulic actuators by appropriately controlling the proportional valves 31 according to the calculated distance between the bucket 6 and the design plane and adjusting the pilot pressures applied to the control valve corresponding to the hydraulic actuators individually and automatically. Details will be described (see FIGS. 4A-4D).

The controller 30 may, for example, automatically expand or contract at least one of the boom cylinder 7, the arm cylinder 8, and the bucket cylinder 9 depending on an operation of the lever device 26B to assist in an excavating work. The excavating work is a work of excavating the ground along a design plane with the tooth tip of the bucket 6. The controller 30 automatically expands or contracts at least one of the boom cylinder 7 and the bucket cylinder 9, for example, when the operator manually operates the operating device 26 (the lever device 26B) in a closing direction of the arm 5 (hereinafter referred to as "arm closing operation"). The machine control function for an excavating work may be performed, for example, by operating the MC switch NS and then operating a predetermined switch included in the input device 42, or by operating a MC switch NS dedicated to an excavating work.

The controller 30 may also automatically expand or contract at least one of the boom cylinder 7, the arm cylinder 8, and the bucket cylinder 9, for example, to assist in a slope finishing work. The slope finishing work is a work of pulling the bucket 6 along a design plane while holding the back face of the bucket 6 on the ground. The controller 30 automatically expands or contracts at least one of the boom cylinder 7 and the bucket cylinder 9 when an arm closing operation is manually performed, for example, through the operating device 26 (the lever device 26B) or through a remote control signal. This causes the bucket 6 to move along the design plane that is a to-be-finished slope while pressing the back face of the bucket 6 on to the slope that is a before-finished slope with predetermined pressing force. The machine control function for a slope finishing work may be performed by operating the MC switch NS and a predetermined switch included in the input device 42, or by operating a MC switch NS dedicated to a slope finishing work.

The controller 30 may also automatically rotate the swiveling hydraulic motor 2A to make the upper swiveling body 3 face a design plane. In this case, a lever device 26D, which corresponds to the swiveling hydraulic motor 2A, in the same way as the lever devices 26A-26C, which correspond to the boom cylinder 7, the arm cylinder 8, and the bucket cylinder 9, is such that the secondary pilot valve is connected to the inlet port of the shuttle valve 32 where the other inlet port is connected with the proportional valve 31. Thus, the controller 30 can automatically swivel the upper swiveling body 3 independent of an operation through the lever device 26D. In this case, the controller 30 may cause the upper swiveling body 3 to face the design plane as a result of a predetermined switch included in the input device 42 being operated. The controller 30 may also cause the upper swiveling body 3 to face the design plane and start the machine control function, merely as a result of MC switch being operated.

The controller 30 may extend or contract the boom cylinder 7 according to a manual operation of the upper swiveling body 3 to assist in, for example, a work of collecting earth into a truck or discharging earth collected in the bucket 6 during an excavating work into a temporary storage area. For example, in a case where a swiveling operation is performed toward the loading platform of a truck in a state where the bucket 6 contains earth, sand, or the like, the controller 30 automatically expands or contracts the boom cylinder through the operating device 26 or through remote control. As a result, it is possible to implement a lifting operation (hereinafter, referred to as a "boom lifting operation") or a lowering operation (hereinafter, referred to as a "boom lowering operation") of the boom 4 in a manner of the operation being performed together with a swiveling operation of the upper swiveling body 3. That is, it is possible to implement a boom lifting and swiveling operation or the boom lowering and swiveling operation merely by manually performing a swiveling operation. The machine control function concerning a boom lifting and swiveling operation or a boom lowering and swiveling operation may be implemented as a result of the MC switch NS being operated and a predetermined switch included in the input device 42 being operated, or as a result of a dedicated MC switch NS being operated.

Some of the functions of the controller 30 may be implemented by another controller. That is, the functions of controller 30 may be implemented in a manner of being distributed into a plurality of controllers. For example, the machine control function described above may be implemented by a dedicated controller.

The discharge pressure sensors 28 detect the discharge pressures of the main pumps 14. Detection signals corresponding to the discharge pressures detected by the discharge pressure sensors 28 are input to the controller 30. The discharge pressure sensors 28 include discharge pressure sensors 28L and 28R, for example, as will be described.

The operating pressure sensor 29 detects the pilot pressure on the secondary side of the operating device 26, i.e., the pilot pressure corresponding to the operated state of the operating device 26 for each to-be-driven element (hydraulic actuator), as described above. The pilot pressure detection signals corresponding to the operated states of the operating device 26 for the lower traveling body 1, the upper swiveling body 3, the boom 4, the arm 5, and the bucket 6 from the operating pressure sensors 29 are input to the controller 30. The operating pressure sensors 29 include operating pressure sensors 29A-29D, for example, as will be described.

The display device 40 is provided at a location within the cabin 10 readily visible from the seated operator to display various information images. The display device 40 is, for example, a liquid crystal display or an organic EL display.

The input device 42 is positioned in the cabin 10 within reach of the seated operator and receives various operations made by the operator. The input device 42 includes a touch panel mounted on a display of a display device for displaying various information images, knob switches mounted at tips of lever units (levers 26L and 26F that will be described) of the lever devices 26A-26D, a button switch, a lever, or a toggle mounted around the display device, or the like. Signals corresponding to the operation contents with respect to the input device 42 are input to the controller 30.

The sound output device 44 is provided in the cabin 10 to output sound. The sound output device 44 may be, for example, a buzzer or a speaker.

The proportional valves 31 are provided to the pilot lines connecting the pilot pumps 15 and the shuttle valves 32 and are configured to change the flow areas (cross-sectional areas in which the hydraulic oil is allowed to flow). The proportional valves 31 operate in response to control commands input from the controller 30. Thus, the controller 30 can supply hydraulic oil discharged by the pilot pumps 15 to the pilot ports of corresponding control valves among the control valves 17 via the proportional valves 31 and shuttle valves 32 even if the operating device 26 (specifically, the lever devices 26A-26C) is not operated by the operator. The proportional valves 31 include proportional valves 31AL, 31AR, 31BL, 31BR, 31CL, and 31CR, as will be described, for example.

The boom angle sensor S1 is mounted to the boom 4 and detects the derricking angle of the boom 4 relative to the upper swiveling body 3 (hereinafter, referred to as a "boom angle"), for example, the angle of the straight line connecting the fulcrum points at both ends of the boom 4 relative to the swiveling plane of the upper swiveling body 3 in a side view. The boom angle sensor S1 may include, for example, a rotary encoder, an acceleration sensor, a 6-axis sensor, an IMU (Inertial Measurement Unit), and so forth. The same will apply to the arm angle sensor S2, the bucket angle sensor S3, and the body tilt sensor S4. A detection signal corresponding to the boom angle by the boom angle sensor S1 is input to the controller 30.

The arm angle sensor S2 is mounted to the arm 5 and detects the rotation angle of the arm 5 with respect to the boom 4 (hereinafter, an "arm angle"), for example, the angle of a line connecting the fulcrum points at both ends of the arm 5 with respect to a straight line connecting the fulcrums at both ends of the boom 4 in side view. A detection signal corresponding to the arm angle by the arm angle sensor S2 is input to the controller 30.

The bucket angle sensor S3 is mounted to the bucket 6 and detects the rotation angle (hereinafter, referred to as a "bucket angle") of the arm 5 with respect to the bucket 6. For example, in a side view, the angle between a straight line connecting the fulcrum points at both ends of the arm 5 and a straight line connecting the fulcrum point and the tip (edge of the blade) of the bucket 6 is detected. A detection signal corresponding to the bucket angle by the bucket angle sensor S3 is input to the controller 30.

The body tilt sensor S4 detects the tilt state of the body (upper swiveling body 3 or lower traveling body 1) relative to the horizontal plane. For example, the body tilt sensor S4 is mounted on the upper swiveling body 3 and detects the tilt angle of the excavator 100 (i.e., the upper swiveling body 3) about the two axes in the vertical directions and the horizontal directions (hereinafter, a "front-rear tilt angle" and a "left-right tilt angle"). Detection signals corresponding to the tilt angles (the front-rear tilt angle of the left-right tilt angle) by the body tilt sensor S4 is input to the controller 30.

The swiveled state sensor S5 outputs detection information concerning the swiveled state of the upper swiveling body 3. The swiveled state sensor S5 detects, for example, the swiveling angular velocity and the swiveled angle of the upper swiveling body 3. The swiveled state sensor S5 includes, for example, a gyro sensor, a resolver, a rotary encoder, and so forth.

The image capturing devices S6 capture the surrounding image of the excavator 100. In other words, the image capturing devices S6 acquire images (image information) as information regarding the three-dimensional space around the excavator 100. The image capturing devices S6 include a camera S6F for imaging the front side of the excavator 100, a camera S6L for imaging the left side of the excavator 100, a camera S6R for imaging the right side of the excavator 100, and a camera S6B for imaging the rear side of the excavator 100.

The camera S6F is mounted, for example, on the ceiling of the cabin 10, i.e., inside the cabin 10. The camera S6F may be mounted on the outside of the cabin 10, such as the roof of the cabin 10, a side surface of the boom 4, or the like. The camera S6L is mounted at the top surface left end of the upper swiveling body 3, the camera S6R is mounted at the top surface right end of the upper swiveling body 3, and the camera S6B is mounted at the top surface rear end of the upper swiveling body 3.

The image capturing devices S6 (the cameras S6F, S6B, S6L, and S6R) are, for example, monocular wide angle cameras having very wide field angles. The image capturing devices S6 may be stereo cameras, distance image cameras, depth cameras, or the like. Images captured by the image capturing devices S6 are input to the controller 30.

The excavator 100 (upper swiveling body 3) may include another sensor capable of acquiring information about the three-dimensional space around the excavator 100 in place of or in addition to the image capturing devices S6. The another sensor may be, for example, a sensor capable of obtaining distance information such as a LIDAR (Light Detection and Ranging) sensor, a milliwave radar, a ultrasonic sensor, an infrared sensor, or the like.

The boom rod pressure sensor S7R and the boom bottom pressure sensor S7B are mounted to the boom cylinder 7 and detect the pressure of the rod side oil chamber of the boom cylinder 7 (hereinafter referred to as "boom rod pressure") and the pressure of the bottom side oil chamber of the boom cylinder 7 (hereinafter referred to as "boom bottom pressure"), respectively. Detection signals corresponding to the boom rod pressure and the boom bottom pressure by the boom rod pressure sensor S7R and the boom bottom pressure sensor S7B are input to the controller 30.

The arm rod pressure sensor S8R and the arm bottom pressure sensor S8B detect the pressure of the rod side oil chamber of the arm cylinder 8 (hereinafter, "arm rod pressure") and the pressure of the bottom side oil chamber of the arm cylinder 8 (hereinafter, "arm bottom pressure"), respectively. Detection signals corresponding to the arm rod pressure and the arm bottom pressure by the arm rod pressure sensor S8R and the arm bottom pressure sensor S8B are input to the controller 30.

The bucket rod pressure sensor S9R and the bucket bottom pressure sensor S9B detect the pressure (hereinafter, "bucket rod pressure") in the rod side oil chamber of the bucket cylinder 9 and the pressure (hereinafter, "bucket bottom pressure") in the bottom side oil chamber of the bucket cylinder 9, respectively. Detection signals corresponding to the bucket rod pressure and the bucket bottom pressure by the bucket rod pressure sensor S9R and the bucket bottom pressure sensor S9B are input to the controller 30.

The positioning device V1 measures the position and orientation of the upper swiveling body 3. The positioning device V1 is, for example, a GNSS (Global Navigation Satellite System) compass that detects the position and orientation of the upper swiveling body 3, and a detection signal corresponding to the position and orientation of the upper swiveling body 3 is input to the controller 30. Among the functions of the positioning device V1, the function of detecting the orientation of the upper swiveling body 3 may be replaced by an orientation sensor mounted on the upper swiveling body 3.

The communication device T1 communicates with the external apparatus through a predetermined network including a mobile communication network, in which a base station is provided at an end, a satellite communication network, the Internet, or the like. The communication device T1 is, for example, a mobile communication module corresponding to a mobile communication standard such as LTE (Long Term Evolution), 4G (4th Generation), and 5G (5th Generation), or a satellite communication module for connecting to a satellite communication network.

[Hydraulic Circuit of Hydraulic Drive System]

Next, the hydraulic circuits of the hydraulic drive system for driving the hydraulic actuators of the excavator 100 will be described with reference to FIG. 3.

Figure 3:
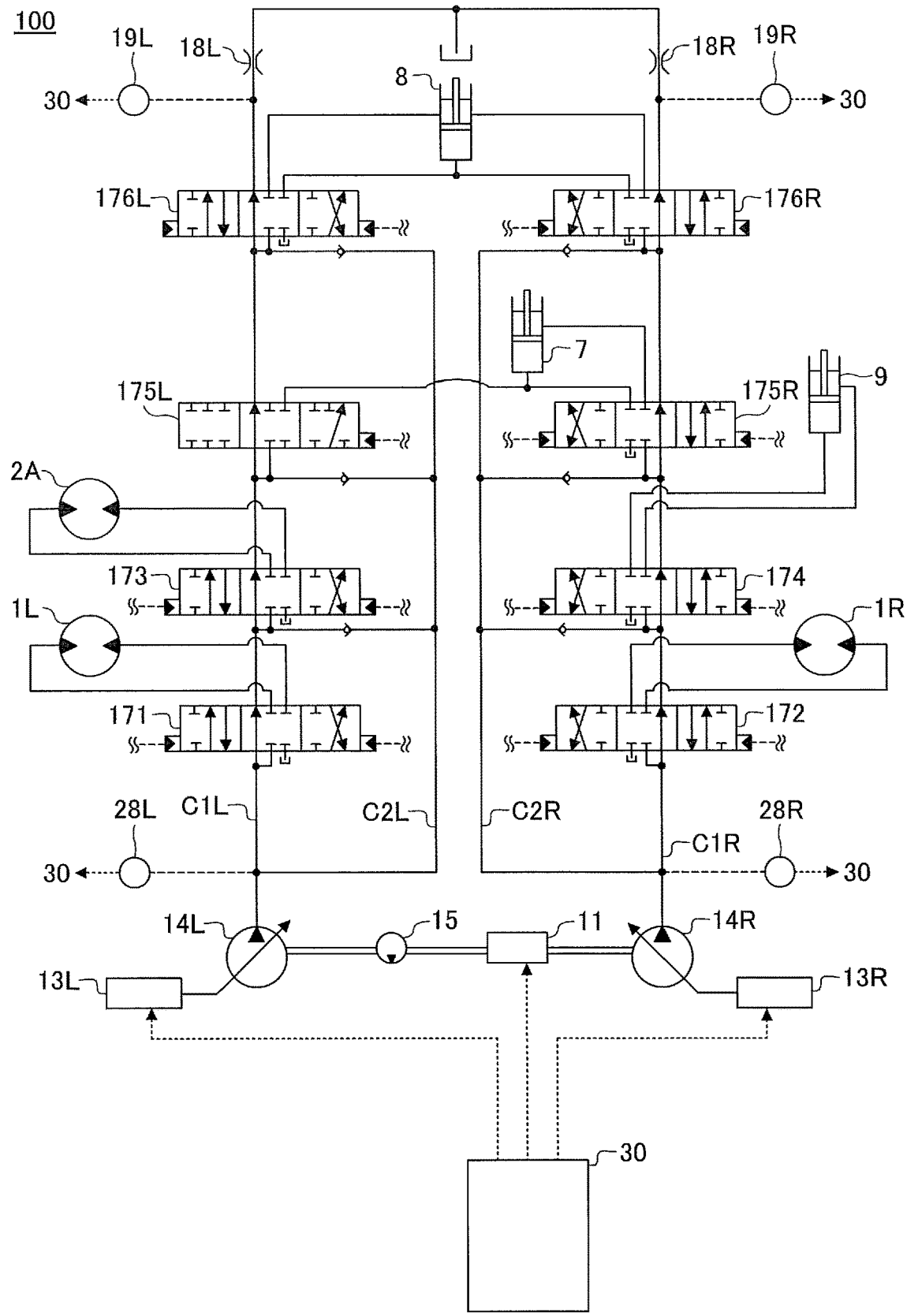
FIG. 3 is a diagram for illustrating an example of a hydraulic circuit of a hydraulic drive system.

FIG. 3 is a diagram for illustrating an example of the hydraulic circuits of the hydraulic drive system.

The hydraulic system implemented by the hydraulic circuits circulates hydraulic oil from the main pumps 14L and 14R driven by the engine 11 to an hydraulic oil tank through center bypass oil passages C1L and C1R, and parallel oil passages C2L and C2R.

The center bypass oil passage C1L passes through the control valves 171, 173, 175L, and 176L disposed in the control valves 17 from the main pump 14L to the hydraulic oil tank.

The center bypass oil passage C1R starts at the main pump 14R and passes through the control valves 172, 174, 175R, and 176R, which are disposed in the control valves 17 to the hydraulic oil tank.

The control valve 171 is a spool valve which feeds the hydraulic oil discharged by the main pump 14L to the traveling hydraulic motor 1L and discharges the hydraulic oil discharged by the traveling hydraulic motor 1L to the hydraulic oil tank.

The control valve 172 is a spool valve which feeds the hydraulic oil discharged by the main pump 14R to the traveling hydraulic motor 1R and discharges the hydraulic oil discharged by the traveling hydraulic motor 1R to the hydraulic oil tank.

The control valve 173 is a spool valve which feeds the hydraulic oil discharged by the main pump 14L to the swiveling hydraulic motor 2A and discharges the hydraulic oil discharged by the swiveling hydraulic motor 2A to the hydraulic oil tank.

The control valve 174 is a spool valve which feeds the hydraulic oil discharged by the main pump 14R to the bucket cylinder 9 and discharges the hydraulic oil in the bucket cylinder 9 to the hydraulic oil tank.

The control valves 175L and 175R are spool valves that supply the hydraulic oil discharged by the main pumps 14L and 14R to the boom cylinder 7 and discharge the hydraulic oil in the boom cylinder 7 to the hydraulic oil tank.

The control valves 176L and 176R supply the hydraulic oil discharged by the main pumps 14L and 14R to the arm cylinder 8 and discharge the hydraulic oil in the arm cylinder 8 to the hydraulic oil tank.

The control valves 171, 172, 173, 174, 175L, 175R, 176L, and 176R, respectively, regulate the flow rates of hydraulic oil fed to and discharged from the hydraulic actuators and switch the directions of flows, depending on the pilot pressures applied to the pilot ports.

The parallel oil passage C2L supplies hydraulic oil of the main pump 14L to the control valves 171, 173, 175L, and 176L in parallel with the center bypass oil passage C1L. Specifically, the parallel oil passage C2L branches from the center bypass oil passage C1L at the upstream side of the control valve 171 so as to supply the hydraulic oil of the main pump 14L in parallel to each of the control valves 171, 173, 175L, and 176R. This allows the parallel oil passage C2L to supply hydraulic oil to the control valves on the downstream side when the flow of hydraulic oil through the center bypass oil passage C1L is restricted or interrupted by either of the control valves 171, 173, and 175L.

The parallel oil passage C2R supplies hydraulic oil of the main pump 14R to the control valves 172, 174, 175R, and 176R in parallel with the center bypass passage C1R. Specifically, the parallel oil passage C2R branches from the center bypass oil passage C1R at the upstream side of the control valve 172 so as to supply the hydraulic oil of the main pump 14R in parallel to each of the control valves 172, 174, 175R, and 176R. The parallel oil passage C2R can supply hydraulic oil to down-stream-side control valves when the flow of hydraulic oil through the center bypass oil passage C1R is restricted or interrupted by either of the control valves 172, 174, and 175R.

The regulators 13L and 13R adjust the discharges of the main pumps 14L and 14R by adjusting the tilt angles of the swash plates of the main pumps 14L and 14R, respectively, under the control of the controller 30. The controller 30 may control the regulators 13L and 13R according to the discharge pressures of the main pumps 14L and 14R detected by the discharge pressure sensors 28L and 28R. For example, the controller 30 adjusts the tilt angle of the main pump 14L through the regulator 13L in response to an increase in the discharge pressure of the main pump 14L to reduce the discharge. The same applies to the regulator 13R. In order that the absorption horsepower of the main pump 14, which is expressed as the product of the discharge pressure and the discharge, does not exceed the output horsepower of the engine 11.

The discharge pressure sensor 28L detects the discharge pressure of the main pump 14L, and a detection signal corresponding to the detected discharge pressure is input to the controller 30. The same applies to the discharge pressure sensor 28R. Thus, the controller 30 can control the regulators 13L and 13R according to the discharge pressures of the main pumps 14L and 14R.

In the center bypass oil passages C1L and C1R, negative control restrictors 18L and 18R are provided between the control valves 176L and 176R and the hydraulic oil tank, which are at most downstream. Accordingly, the flows of hydraulic oil discharged by the main pumps 14L and 14R are restricted by the negative control restrictors 18L and 18R. The negative control restrictors 18L and 18R generate control pressures (hereinafter, "negative control pressures") for controlling the regulators 13L and 13R.

Negative control pressure sensors 19L and 19R detect the negative control pressures, and detection signals corresponding to the detected negative control pressures are input to the controller 30.

The controller 30 controls the discharges of the main pumps 14L and 14R by controlling the regulators 13L and 13R and adjusting the tilt angle of the swash plates of the main pumps 14L and 14R in response to the negative control pressures. The controller 30 decreases the discharges of the main pumps 14L and 14R as the negative control pressures increase, and increases the discharges of the main pumps 14L and 14R as the negative control pressure decrease.

Specifically, as depicted in FIG. 3, when all of the hydraulic actuators in the excavator 100 are not operated, i.e., are in standby states, the hydraulic oil discharged by the main pumps 14L and 14R reaches the negative control restrictors 18L and 18R through the center bypass oil passages C1L and C1R. The flows of the hydraulic oil discharged by the main pumps 14L and 14R increase the negative control pressures generated on the upstream sides of the negative control restrictors 18L and 18R. As a result, the controller 30 reduces the discharges of the main pumps 14L and 14R to the allowable minimum discharges and suppresses the pressure loss (pumping loss) when the discharged hydraulic oil passes through the center bypass oil passages C1L and C1R.

On the other hand, when any one of the hydraulic actuators is operated, the hydraulic oil discharged by the main pumps 14L and 14R flows into the hydraulic actuator to be operated through a control valve corresponding to the hydraulic actuator to be operated. The flows of the hydraulic oil discharged by the main pumps 14L and 14R decrease or cut to zero the amount reaching the negative control restrictors 18L and 18R, thereby lowering the negative control pressures generated on the upstream side of the negative control restrictors 18L and 18R. As a result, the controller 30 can increase the discharges of the main pumps 14L and 14R, circulate sufficient hydraulic oil in the hydraulic actuator to be operated, and reliably drive the hydraulic actuator to be operated.

As described above, the hydraulic system can suppress useless energy consumption of the main pumps 14L and 14R including the pumping loss generated in the center bypass oil passages C1L and C1R by the hydraulic oil discharged by the main pumps 14L and 14R in a standby state. In addition, the hydraulic system can supply necessary and sufficient hydraulic oil from the main pumps 14L and 14R to a hydraulic actuator to be operated.

[Hydraulic Circuits of Operation System]

Referring now to FIGS. 4A-4D, hydraulic circuits of the operation system, specifically the pilot circuits for applying pilot pressures to the control valves 173-176, will be described.

FIG. 4 (FIGS. 4A-4D) depicts examples of pilot circuit configurations for applying pilot pressures to the control valves 173-176 for hydraulic control of the hydraulic actuators corresponding to the attachments and the upper swiveling body 3. Specifically, FIG. 4A is a diagram for illustrating an example of a pilot circuit for applying a pilot pressure to the control valves 175L and 175R for hydraulic control of the boom cylinder 7. FIG. 4B depicts an example of a pilot circuit for applying a pilot pressure to the control valves 176L and 176R for controlling the hydraulic pressure of the arm cylinder 8. FIG. 4C depicts an example of a pilot circuit for applying a pilot pressure to the control valve 174 for hydraulic control of the bucket cylinder 9. FIG. 4D depicts an example of a pilot circuit for applying a pilot pressure to the control valve 173 for hydraulic control of the swiveling hydraulic motor.

Figure 4A:
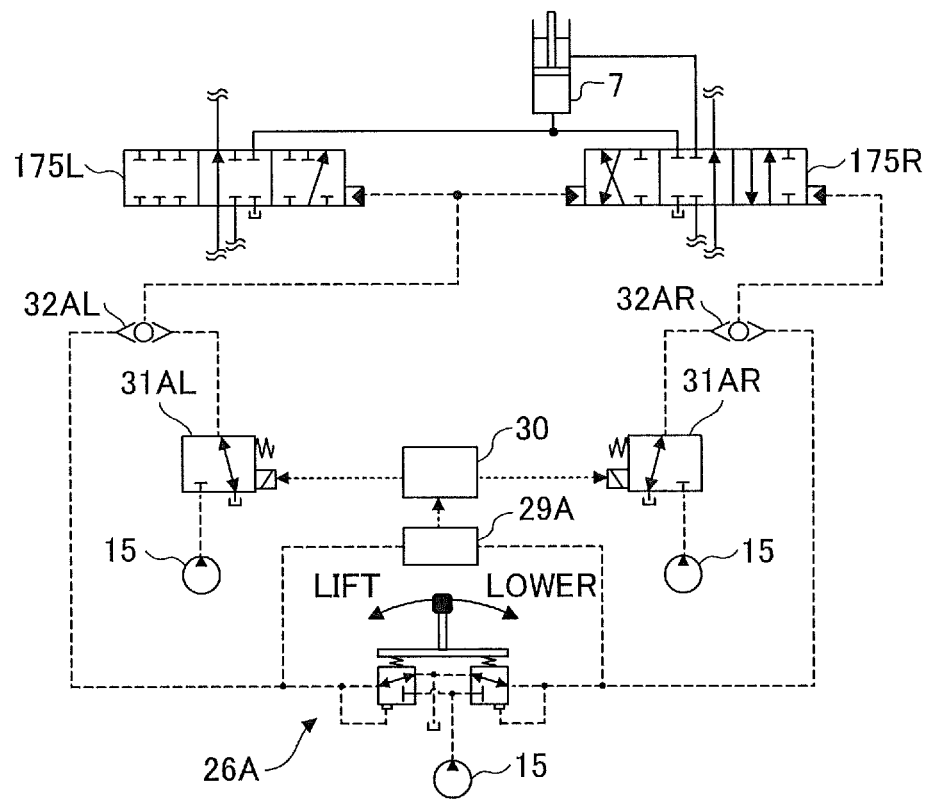
FIG. 4A is a diagram for illustrating an example of a pilot circuit for applying a pilot pressure to a control valve for implementing hydraulic control of a boom cylinder.

As depicted in FIG. 4A, the lever device 26A is used to operate the boom cylinder 7 corresponding to the boom 4. That is, the lever device 26A has an operational object that is operating the boom 4. The lever device 26A uses the hydraulic oil discharged from the pilot pump 15 to output the pilot pressure to the secondary side according to the operated state.

The two inlet ports of the shuttle valve 32AL are connected to the secondary pilot line of the lever device 26A corresponding to an lifting operation of the boom 4 (hereinafter, "boom lifting operation") and the secondary pilot line of the proportional valve 31AL, respectively. The outlet port of the shuttle valve 32AL is connected to the pilot port at the right side of the control valve 175L and to the pilot port at the left side of the control valve 175R.

The two inlet ports of the shuttle valve 32AR are connected to the secondary pilot line of the lever device 26A corresponding to a lowering operation of the boom 4 (hereinafter, "boom lowering operation") and the secondary pilot line of the proportional valve 31AR, respectively. The outlet port of the shuttle valve 32AR is connected to the pilot port at the right side of the control valve 175R.

That is, the lever device 26A applies a pilot pressure according to the operated states to the pilot ports of the control valves 175L and 175R through the shuttle valves 32AL and 32AR. Specifically, in response to a boom lifting operation being performed, the lever device 26A outputs a pilot pressure according to the operating amount to one inlet port of the shuttle valve 32AL to apply the pilot pressure to the pilot port at the right side of the control valve 175L and the pilot port at the left side of the control valve 175R through the shuttle valve 32AL. in response to a boom lowering operation being performed, the lever device 26A outputs a pilot pressure according to the operating amount to one inlet port of the shuttle valve 32AR to apply the pilot pressure to the pilot port at the right side of the control valve 175R through the shuttle valve 32AR.

The proportional valve 31AL operates in response to a control current input from the controller 30. Specifically, the proportional valve 31AL uses hydraulic oil discharged from the pilot pump 15 to output a pilot pressure, in response to the control current input from the controller 30, to the other inlet port of the shuttle valve 32AL. This allows the proportional valve 31AL to adjust the pilot pressures applied to the pilot port at the right side of control valve 175L and the pilot port at the left side of control valve 175R through the shuttle valve 32AL.

The proportional valve 31AR operates in response to a control current input from the controller 30. Specifically, the proportional valve 31AR uses hydraulic oil discharged from the pilot pump 15 to output a pilot pressure corresponding to the control current input from the controller 30 to the other inlet port of the shuttle valve 32AR. This allows the proportional valve 31AR to adjust the pilot pressure applied to the pilot port at the right of the control valve 175R through the shuttle valve 32AR.

That is, the proportional valves 31AL and 31AR can adjust the pilot pressures output to the secondary side so that the control valves 175L and 175R can be stopped at desired valve positions independent of the operated state of the lever device 26A.

As a result, the operating pressure sensor 29A detects the operated state of the lever device 26A operated by the operator as a pressure, and the detection signal corresponding to the detected pressure is input to the controller 30. The controller 30 can determine the operated state of the lever device 26A. An operated state includes, for example, an operating direction and an operating amount (operating angle). The same will apply to the lever devices 26B-26D.

The controller 30 may supply hydraulic oil discharged by the pilot pump 15 to the pilot port at the right side of the control valve 175L and the pilot port at the left side of the control valve 175R through the proportional valve 31AL and the shuttle valve 32AL, independent of the operator's boom lifting operation on the lever device 26A. The controller 30 may also supply hydraulic oil discharged by the pilot pump 15 to the pilot port at the right side of the control valve 175R through the proportional valve 31AR and the shuttle valve 32AR, independent of the operator's boom lowering operation on the lever device 26A. That is, the controller 30 can automatically control lifting and lowering operations of the boom 4.

Figure 4B:
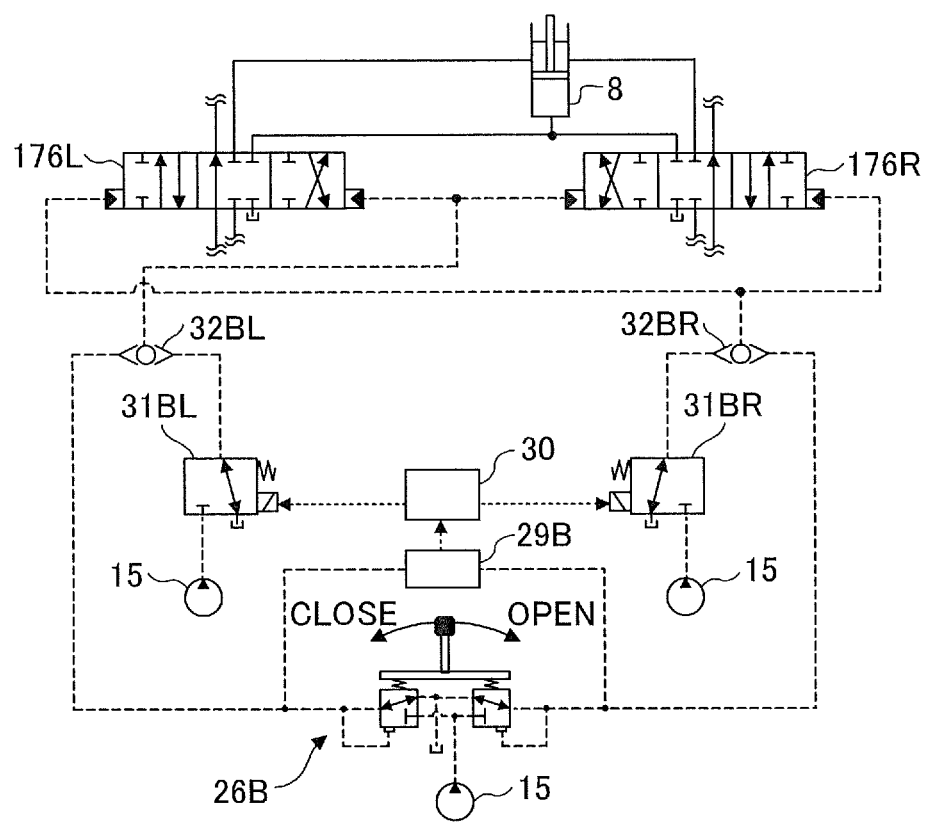
FIG. 4B is a diagram for illustrating an example of a pilot circuit for applying a pilot pressure to a control valve for implementing hydraulic control of an arm cylinder.

As depicted in FIG. 4B, the lever device 26B is used to operate the arm cylinder 8 corresponding to the arm 5. That is, an operational object of the lever device 26B is an operation of the arm 5. The lever device 26B uses the hydraulic oil discharged from the pilot pump 15 to output the pilot pressure according to the operated state to the secondary side.

The two inlet ports of the shuttle valve 32BL are connected to the secondary pilot line of the lever device 26B corresponding to a closing operation of the arm 5 (hereinafter, "arm closing operation") and the secondary pilot line of the proportional valve 31BL, respectively. The outlet port of the shuttle valve 32BL is connected to the pilot port at the right side of control valve 176L and to the pilot port at the left side of control valve 176R.

The two inlet ports of the shuttle valve 32BR are connected to the secondary pilot line of the lever device 26B, corresponding to an opening operation of the arm 5 (hereinafter, "arm opening operation"), and a secondary pilot line of the proportional valve 31BR, respectively. The outlet port of the shuttle valve 32BR is connected to the pilot port at the left side of the control valve 176L and to the pilot port at the right side of the control valve 176R.

That is, the lever device 26B applies control pressures according to the operated state to the pilot ports of the control valves 176L and 176R through the shuttle valves 32BL and 32BR. Specifically, when an arm closing operation is performed, the lever device 26B outputs a pilot pressure according to the operating amount to one inlet port of the shuttle valve 32BL to apply the pilot pressure to the pilot port at the right side of the control valve 176L and the pilot port at the left side of the control valve 176R through the shuttle valve 32BL. When an arm opening operation is performed, the lever device 26B outputs a pilot pressure according to the operating amount to one inlet port of the shuttle valve 32BR to apply the pilot pressure to the pilot port at the left side of the control valve 176L and the pilot port at the right side of the control valve 176R through the shuttle valve 32BR.

The proportional valve 31BL operates according to a control current input from the controller 30. Specifically, the proportional valve 31BL uses hydraulic oil discharged from the pilot pump 15 to output the pilot pressure according to the control current input from the controller 30 to the other pilot port of the shuttle valve 32BL. This allows the proportional valve 31BL to adjust the pilot pressure applied to the pilot port at the right side of the control valve 176L and the pilot port at the left side of the control valve 176R through the shuttle valve 32BL.

The proportional valve 31BR operates according to a control current input from the controller 30. Specifically, the proportional valve 31BR uses hydraulic oil discharged from the pilot pump 15 to output a pilot pressure according to the control current input from the controller 30 to the other pilot port of the shuttle valve 32BR. This allows the proportional valve 31BR to adjust the pilot pressure applied to the pilot port at the left side of the control valve 176L and the pilot port at the right side of the control valve 176R through the shuttle valve 32BR.

That is, the proportional valves 31BL and 31BR can adjust pilot pressures to be output to the secondary side so that the control valves 176L and 176R can be stopped at desired valve positions, independent of the operated state of the lever device 26B.

The operating pressure sensor 29B detects an operated state of the lever device 26B operated by the operator as a pressure, and a detection signal corresponding to the detected pressure is input to the controller 30. This allows the controller 30 to detect the operated state of the lever device 26B.

The controller 30 may supply hydraulic oil discharged by the pilot pump 15 to the pilot port at the right side of the control valve 176L and the pilot port at the left side of the control valve 176R through the proportional valve 31BL and the shuttle valve 32BL, independent of an arm closing operation performed by the operator on the lever device 26B. The controller 30 may also supply hydraulic oil discharged by the pilot pump 15 to the pilot port at the left side of the control valve 176L and the pilot port at the right side of the control valve 176R through the proportional valve 31BR and the shuttle valve 32BR, independent of an arm opening operation performed by the operator on the lever device 26B. That is, the controller 30 can automatically control opening and closing operations of the arm 5.

Figure 4C:
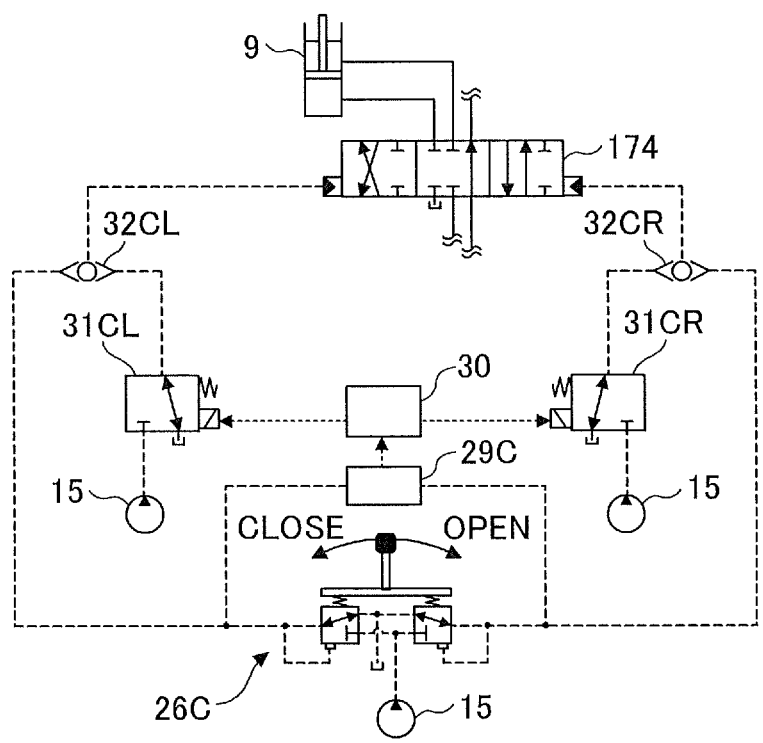
FIG. 4C is a diagram for illustrating an example of a pilot circuit for applying a pilot pressure to a control valve for implementing hydraulic control of a bucket cylinder.

As depicted in FIG. 4C, the lever device 26C is used to operate the bucket cylinder 9 corresponding to the bucket 6. That is, an operational object of the lever device 26C is operation of the bucket 6. The lever device 26C uses hydraulic oil discharged from the pilot pump 15 to output a pilot pressure according to the operated state to the secondary side.

The two inlet ports of the shuttle valve 32CL are connected to the pilot line on the secondary side of the lever device 26C, corresponding to a closing operation of the bucket 6 (hereinafter, "bucket closing operation"), and the pilot line on the secondary side of the proportional valve 31CL, respectively. The outlet port of the shuttle valve 32CL is connected to the pilot port at the left side of the control valve 174.

The two inlet ports of the shuttle valve 32AR are connected to the pilot line on the secondary side of the lever device 26C, corresponding to an opening operation of the bucket 6 (hereinafter, "bucket opening operation"), and the pilot line on the secondary side of the proportional valve 31CR, respectively. The outlet port of the shuttle valve 32AR is connected to the pilot port at the right side of the control valve 174.

That is, the lever device 26C applies a pilot pressure according to the operated state to the pilot port of the control valve 174 through the shuttle valves 32CL and 32CR. Specifically, when a bucket closing operation is performed, the lever device 26C outputs a pilot pressure according to the operating amount to one inlet port of the shuttle valve 32CL to apply the pilot pressure to the pilot port at the left side of the control valve 174 through the shuttle valve 32CL. When a bucket opening operation is performed, the lever device 26C outputs a pilot pressure according to the operating amount to one inlet port of the shuttle valve 32CR to apply the pilot pressure to the pilot port at the right of the control valve 174 through the shuttle valve 32CR.

The proportional valve 31CL operates according to a control current input from the controller 30. Specifically, the proportional valve 31CL uses hydraulic oil discharged from the pilot pump 15 to output a pilot pressure according to the control current input from the controller 30 to the other pilot port of the shuttle valve 32CL. This allows the proportional valve 31CL to adjust the pilot pressure applied to the pilot port at the left side of the control valve 174 through the shuttle valve 32CL.

The proportional valve 31CR operates according to a control current output by the controller 30. Specifically, the proportional valve 31CR uses hydraulic oil discharged from the pilot pump 15 to output a pilot pressure according to the control current input from the controller 30 to the other pilot port of the shuttle valve 32CR. This allows the proportional valve 31CR to adjust the pilot pressure applied to the pilot port at the right of the control valve 174 through the shuttle valve 32CR.

That is, the proportional valves 31CL and 31CR can adjust the pilot pressure output to the secondary side so that the control valve 174 can be stopped at a desired position, independent of the operated state of the lever device 26C.

The operating pressure sensor 29C detects the operated state of the lever device 26C operated by the operator as a pressure, and a detection signal corresponding to the detected pressure is input to the controller 30. This allows the controller 30 to detect the operated status of the lever device 26C.

The controller 30 can cause hydraulic oil discharged from the pilot pump 15 to be supplied to the pilot port at the left side of the control valve 174 through the proportional valve 31CL and the shuttle valve 32CL, independent of the operator's bucket closing operation performed on the lever device 26C. The controller 30 can also cause hydraulic oil discharged from the pilot pump 15 to be supplied to the pilot port at the right side of the control valve 174 through the proportional valve 31CR and the shuttle valve 32CR, independent of the operator's bucket opening operation performed on the lever device 26C. That is, the controller 30 can automatically control opening and closing operations of the bucket 6.

Figure 4D:
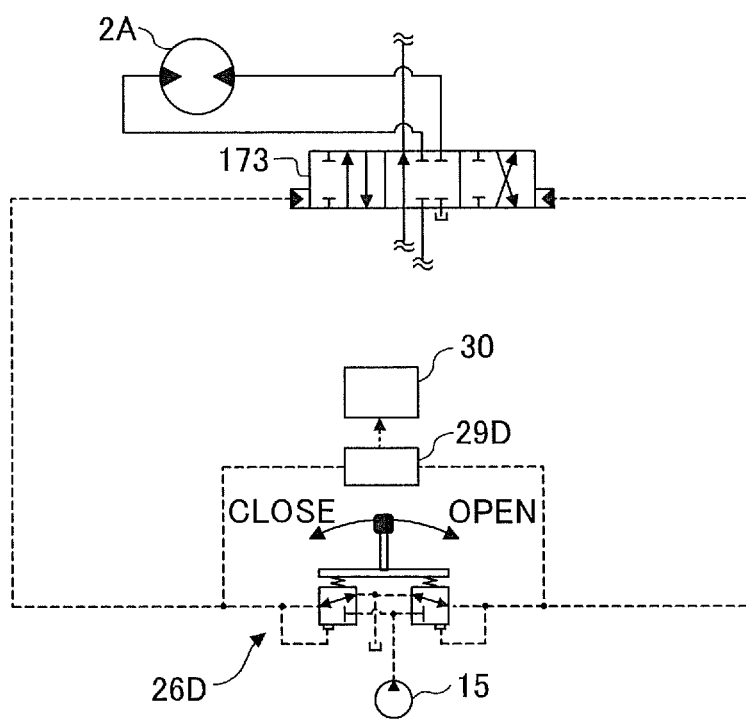
FIG. 4D is a diagram for illustrating an example of a pilot circuit for applying a pilot pressure to a control valve for implementing hydraulic control of a swiveling hydraulic motor.

As depicted in FIG. 4D, the lever device 26D is used to operate the swiveling hydraulic motor corresponding to a swiveling operation of the upper swiveling body 3. That is, an operational object of the lever device 26D is a swiveling operation of the upper swiveling body 3. The lever device 26D uses hydraulic oil discharged from the pilot pump 15 to apply a pilot pressure according to the operated state to the pilot port of the control valve 173.

The operating pressure sensor 29D detects the operated state of the lever device 26D operated by the operator as a pressure, and a detection signal corresponding to the detected pressure is input to the controller 30. This allows the controller 30 to detect the operated state of the lever device 26D.

The excavator 100 may be configured to automatically swivel the upper swiveling body 3. In this case, a hydraulic system that includes proportional valves 31 and shuttle valves 32 is employed for a pilot circuit that applies a pilot pressure to the control valve 173, similarly to FIGS. 4A-4C. In addition, the excavator 100 may be provided with a configuration in which the lower traveling body 1 automatically moves forward and backward. In this case, a hydraulic system including proportional valves 31 and shuttle valves 32 is employed for a pilot circuit for applying pilot pressures to the control valves 171 and 172 corresponding to the traveling hydraulic motors 1L and 1R, similarly to the case of FIGS. 4A-4D.

[Functional Configuration of Machine Control Function]

Next, a functional configuration of the machine control function of the excavator 100 will be described with reference to FIGS. 5 and 6.

Figure 5:
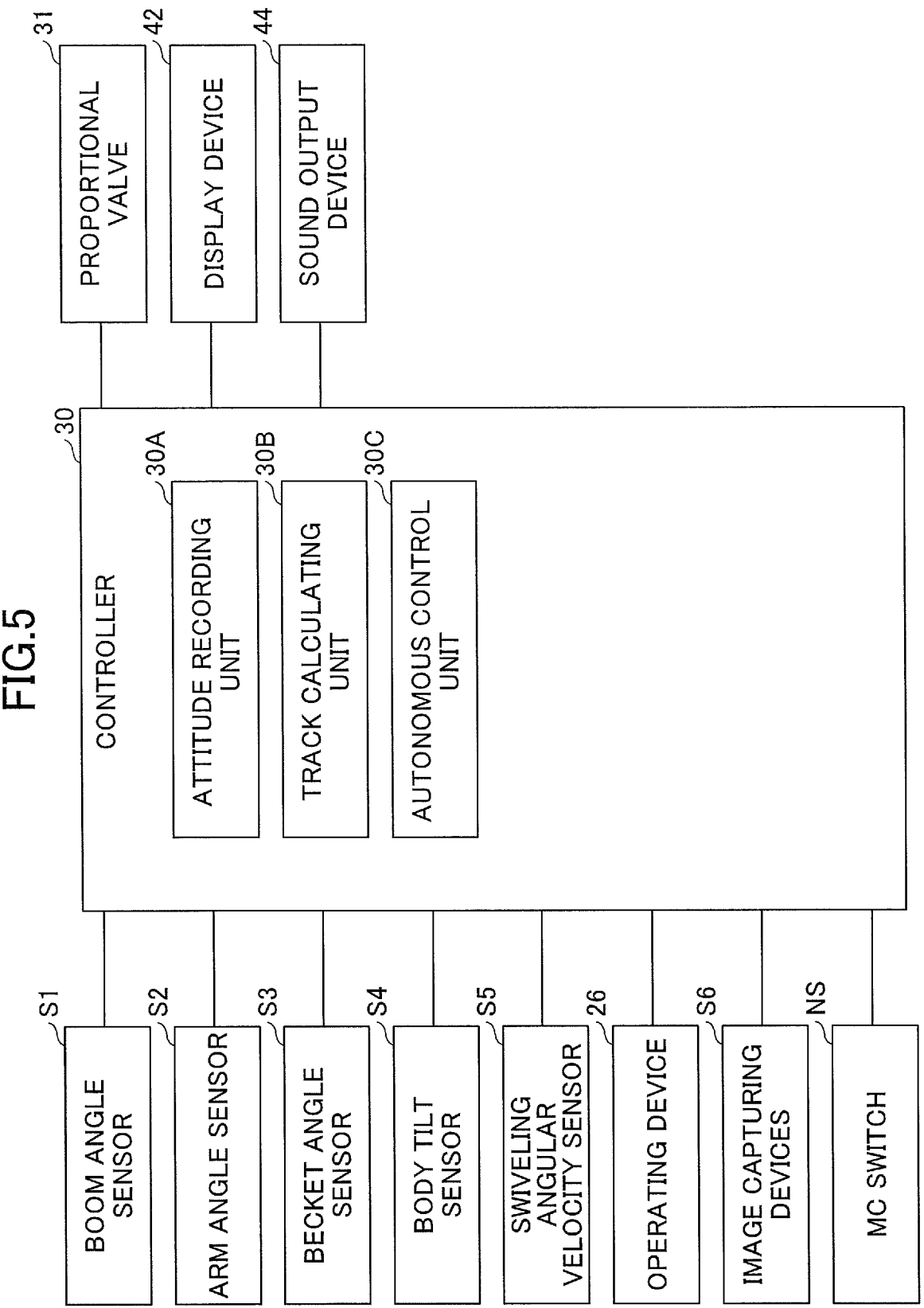
FIG. 5 is a functional block diagram for illustrating an example of a functional configuration of a machine control function.
Figure 6:
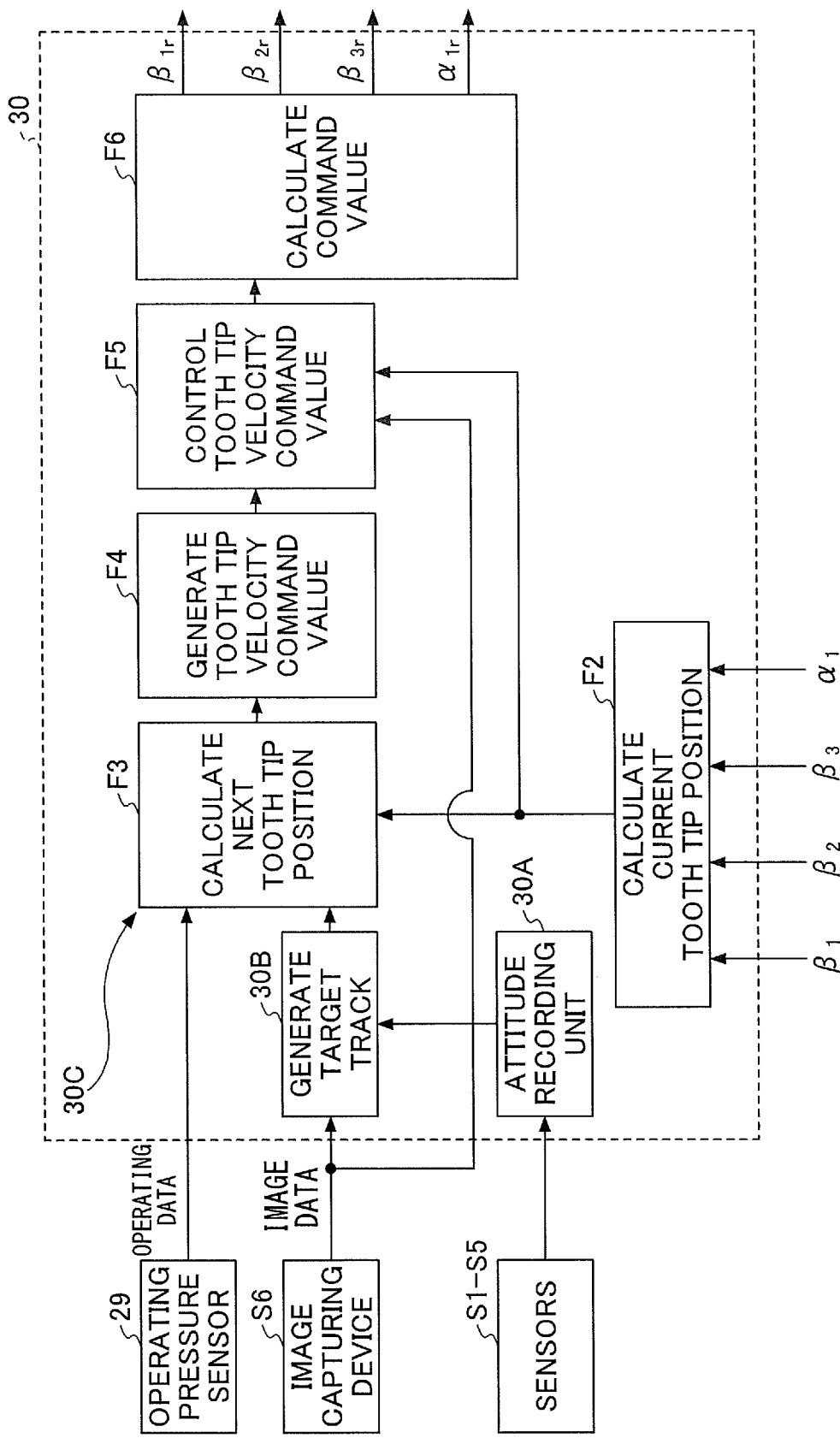
FIG. 6 is a functional block diagram for illustrating an example of a functional configuration of the machine control function.

FIG. 5 and FIG. 6 are functional block diagrams for illustrating an example of a functional configuration of the machine control function of the excavator 100.

As depicted in FIGS. 5 and 6, the controller 30 includes an attitude recording unit 30A, a track calculating unit 30B, and an autonomous control unit 30C as functional units that are implemented by executing, for example, a predetermined program installed in an auxiliary storage device by a CPU.

The attitude recording unit 30A records information regarding the attitude of the excavator 100 (hereinafter, "excavator attitude information") in a predetermined storage device (for example, a ring buffer set in a RAM). For example, the attitude recording unit 30A records information about the attitude of the excavator 100 when the MC switch NS is pressed, in the RAM (the ring buffer). That is, the attitude recording unit 30A records the excavator attitude information in the RAM or the like when the machine control function is activated. Specifically, the attitude recording unit 30A records the outputs of the sensors S1-S5 when the MC switch NS is pressed.

The track calculating unit 30B calculates a target track through which a predetermined working portion of the excavator 100 (for example, the tooth tip or the back face of the bucket 6, or the like) passes when the machine control function is activated. Specifically, the track calculating unit 30B calculates a target track of a predetermined working portion based on the attitude information of the excavator 100 recorded by the attitude recording unit 30A or image data of the image capturing devices S6.

The autonomous control unit 30C is configured to operate the excavator 100 autonomously when the machine control function is activated. Autonomous means a manner in which operation of a to-be-driven element (hereinafter referred to as a "slave element") other than a to-be-driven element to be manually operated (hereinafter referred to as a "master element") is controlled to perform a predetermined operation, according to autonomous determination of the controller 30. In other words, autonomous may mean that operation of a hydraulic actuator other than a hydraulic actuator to be manually operated (hereinafter referred to as a "master actuator") is controlled to perform a predetermined operation according to autonomous determination of the controller 30. When a predetermined starting condition is satisfied, the autonomous control unit 30C moves a predetermined working portion of the excavator 100 along a target track calculated by the track calculating unit 30B. For example, the autonomous control unit 30C moves the excavator 100 autonomously so that a predetermined working portion of the excavator 100 moves along a target track when the operating device 26 is operated in a case where the MC switch NS is pressed.

As depicted in FIG. 6, the autonomous control unit 30C includes functional units F2-F6.

The functional unit F2 calculates the current position (hereinafter referred to as a "current bucket position") of a predetermined working portion (for example, tooth tip of the bucket 6) of the bucket 6. Specifically, the current bucket position is calculated based on the boom angle β1, the arm angle β2, the bucket angle β3, and the swiveled angle α1 detected by the boom angle sensor S1, the arm angle sensor S2, the bucket angle sensor S3, and the swiveled state sensor S5.

The functional unit F3 calculates a next target position (that is, a target position to be reached during a control cycle) of the working portion of the bucket 6 (hereinafter referred to as a "next target position") based on the target track calculated by the track calculating unit 30B and the current bucket position calculated by the functional unit F2.

The functional unit F4 generates a speed command value for the working portion of bucket 6 based on the next target position of the working portion of the bucket 6 calculated by the functional unit F3.

The functional unit F5 corrects the speed command value and outputs the corrected speed command value so that the movement speed of the working portion of the bucket 6 is limited when a predetermined operation limiting condition to restrict operation of the excavator 100 is satisfied. The operation limiting condition may include, for example, a condition that "the attachment, body, or the like including the working portion of the excavator 100 may come into contact with an obstacle". The operation limiting condition may include, for example, a condition that "a limiting criterion with respect to response characteristics (a rotational speed) of the to-be-driven element is exceeded" or the like. The functional unit F5 determines whether the operation limiting condition is satisfied based on an image captured by the image capturing devices S6, the current position of the bucket 6, or the like. When the operation limiting condition is not satisfied, the functional unit F5 outputs the speed command value generated by the functional unit F4 as it is to the functional unit F6. When the operation limiting condition is satisfied, the functional unit F5 outputs the corrected speed command value to the functional unit F6.

The functional unit F6 outputs a command value with respect to each of the to-be-driven elements (the boom 4, the arm 5, the bucket 6, and the upper swiveling body 3) based on the speed command value of the working portion of the bucket 6. For example, the functional unit F6 outputs a boom command value β1r, an arm command value β2r, a bucket command value β3r, and a swivel command value β1r corresponding to target values of the boom angle, the arm angle, the bucket angle, and the swiveled angle.

For example, the autonomous control unit 30C performs feedback control of the proportional valves 31 in such a manner that the deviations of the actual boom angle, arm angle, bucket angle, and swiveled angle from the boom command value β1r, the arm command value β2r, the bucket command value β3r, and the swiveling command value α1r become zero. Thus, the autonomous control unit 30C can move the position of the working portion of the bucket 6 along the target track.

[Specific Examples of Operational Objects with Respect to Operating Directions of Left-Hand and Right-Hand Levers]

Figures 7A, 7B:
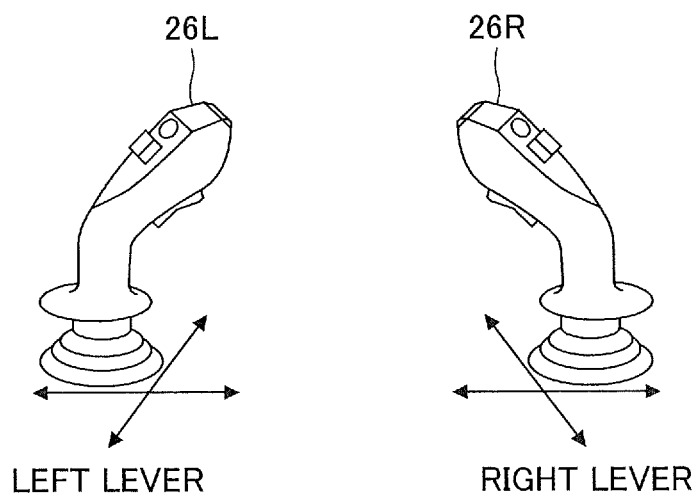
FIG. 7A is a diagram for illustrating an arrangement of levers corresponding to lever devices in a cabin viewed from an operator.
FIG. 7B is a diagram for illustrating an example of allocations of operations of to-be-driven elements (working bodies) as operational objects for each of operating directions (vertical and horizontal directions) of each of left-hand and right-hand levers.

Referring now to FIG. 7 (FIGS. 7A and 7B), operational objects with respect to operating directions of the two left-hand and right-hand levers 26L and 26R disposed near the cockpit in the cabin 10 in a normal control mode will be described.

FIG. 7A depicts an arrangement of the levers 26L and 26R corresponding to the lever devices 26A-26D in the cabin 10 viewed from the operator. FIG. 7B depicts examples of allocations of operations of the attachments as the operational objects to the left-hand and right-hand levers 26L and 26R.

As depicted in FIG. 7A, in the cabin 10, the levers 26L and 26R, which are gripped by the operator to operate the lever devices 26A-26D, are disposed. Specifically, the lever 26L is disposed at the left side and the lever 26R is disposed at the right side from the viewpoint of the operator.

Each of the levers 26L and 26R is configured to be operable (tiltable) in forward and backward directions (also referred to as vertical directions) and left and right directions (also referred to as horizontal directions) when viewed from the operator. That is, each of the levers 26L and 26R as lever units is shared by two lever devices among the lever devices 26A-26D as a result of having forward and backward operations and left and right operations.

As depicted in FIG. 7B, in the example, operation of the arm 5 is allocated as an operational object corresponding to forward and backward operations of the left-hand lever 26L, and a swiveling operation of the upper swiveling body 3 is allocated as an operational object corresponding to left and right operations of the left-hand lever 26L. That is, the lever device 26B and the lever device 26D share the left-hand lever 26L as a lever unit gripped by the operator.

An operational object corresponding to forward and backward operations of the right-hand lever 26R is allocated to operation of the boom 4, and an operational object corresponding to right and left operations of the right-hand lever 26R is allocated to operation of the bucket 6. That is, the lever device 26A and the lever device 26C share the right-hand lever 26R as a lever unit gripped by the operator.

This allows the operator to manually operate the upper swiveling body 3 and the attachments (the boom 4, the arm 5, and the bucket 6) by operating the left-hand and right-hand levers 26L and 26R forward, backward, rightward, or leftward, in a state where the machine control function is not activated (i.e., the MC switch NS is not operated).

Hereinafter, description will be made based on the above-described corresponding relationships with respect to the levers 26L and 26R and the lever devices 26A-26D.

[Examples of Operational Object Allocating Methods]

Next, examples (first through third examples) of methods of allocating a different operational object to a lever device corresponding to an actuator not required to be manually operated when the machine control function is activated will be described with reference to FIGS. 8-10. An actuator not required be manually operated when the machine control function is activated is a slave actuator not required to be individually operated as a result of being autonomously controlled to operate together with an operation of a master actuator. That is, a lever device corresponding to an actuator not required to be manually operated when the machine control function is activated is a lever device that is used to operate a slave actuator (slave element) in a state in which the machine control function is not activated, that is, in a normal control mode.

Example 1 of Operational Object Allocating Method

Figures 8A, 8B:
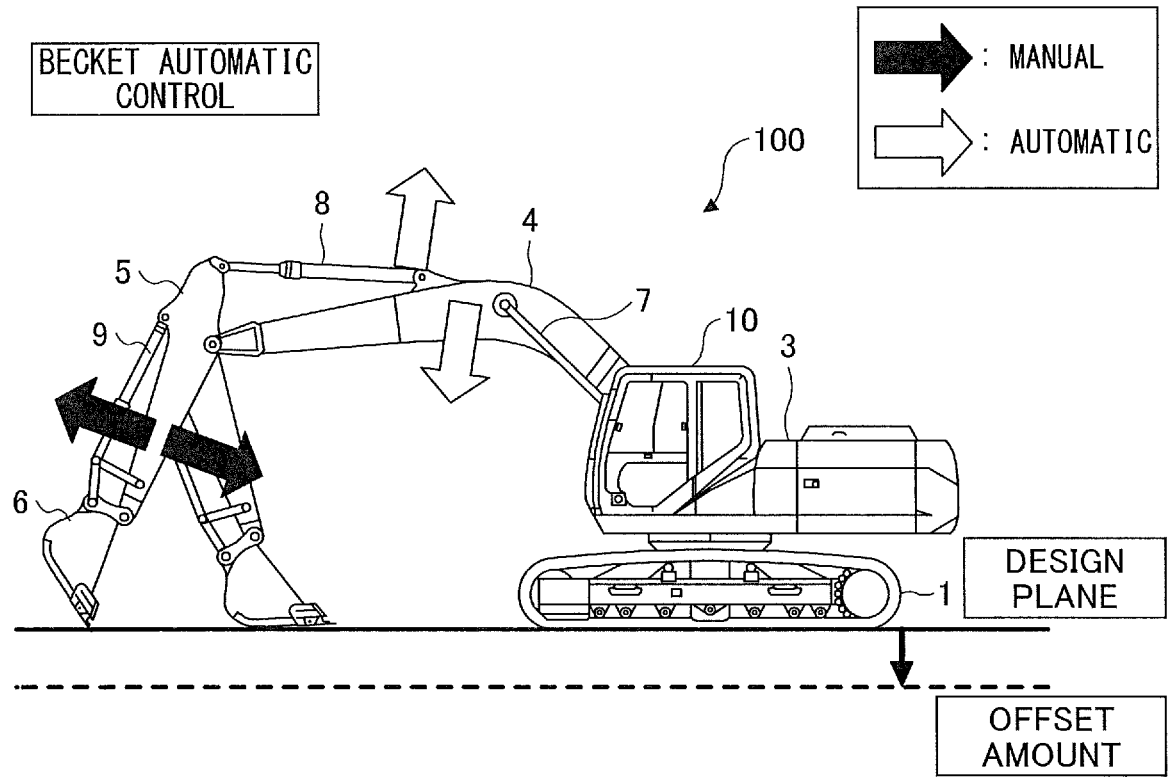
FIG. 8A is a diagram for illustrating a first example of a working state of the excavator with the machine control function.
FIG. 8B is a diagram for illustrating the first example of an allocation of a different operational object to a lever device corresponding to an actuator not required to be manually operated when the machine control function is activated.

First, FIG. 8 (FIGS. 8A and 8B) depicts a first example of a method of allocating a different operational object to a lever device corresponding to an actuator that does not required to be manually operated when the machine control function is activated. Specifically, FIG. 8A is a diagram for illustrating a first example of a working state of the excavator 100 using the machine control function. FIG. 8B depicts the first example of allocating a different operational object to a lever device corresponding to an actuator not required to be manually operated when the machine control function is activated.

As depicted in FIG. 8A, in the example, the excavator 100 automatically drives only the boom 4 by the machine control function in response to an opening or closing operation of the arm 5 performed on the lever device 26B (an example of one lever device), and performs an excavating work and a leveling work. That is, in the example, the master element and the master actuator are the arm 5 and the arm cylinder 8, respectively, and the slave element and the slave actuator are the boom 4 and the boom cylinder 7, respectively.

In the present example, in a state where the machine control function is activated, manual operation of the boom 4 (boom cylinder 7) using the lever device 26A (an example of another lever device) is not required. Therefore, the controller 30 deactivates manual operation of the boom 4 using the lever device 26A. Specifically, for example, a changeover valve is provided which allows the hydraulic oil in the pilot line on the secondary side of the lever device 26A to be discharged to the hydraulic oil tank. By thus outputting the control command to the changeover valve, the controller 30 can prevent the pilot pressure from the lever device 26A from being applied to the control valve 175 via the shuttle valves 32AL and 32AR. In this case, a restrictor or the like may be provided at the changeover valve or on the upstream side of the changeover valve so that, even when the hydraulic oil is thus discharged to the hydraulic oil tank by the changeover valve, the secondary pressure of the lever device 26A corresponds to the operated state (operating amount) of the lever device 26A. As will be described later, when an electric operating device 26 is employed, the controller 30 may prevent a control command corresponding to the operation contents from being output to the proportional valves 31AL and 31AR even if an electrical signal corresponding to an operation of the boom 4, that is, an electrical signal corresponding to an operation of the lever device 26A, is input from the operating device 26. Also when the excavator 100 is operated remotely, remote control of the boom 4 (boom cylinder 7) is deactivated even when a remote control signal (operation input) corresponding to operation of the boom 4 is received in a state where the machine control function is activated. Hereinafter, an operation input for a slave element (slave actuator) when the master control function is activated is processed by the controller 30 in the same manner also for the second through fifth examples that will now be described.

As depicted in FIG. 8B, the controller 30 allocates an operational object different from operation of the boom 4 (boom cylinder 7) to the lever device 26A that is used to individually operate the boom 4 (boom cylinder 7) not required to be manually operated when the machine control function is activated. Specifically, setting of an offset amount (an example of a parameter) from a design plane is allocated as an operational object of forward and backward operations of the right-hand lever 26R corresponding to the lever device 26A. Similarly, when the excavator 100 is operated remotely, an operational object that is different from operation of the boom 4 (in the example, setting of an offset amount from a design plane) is allocated as an operational object of a remote control signal in which the boom 4 is designated as an operational object, that is, a remote control signal corresponding to operation related to the boom 4. That is, the controller 30 sets an offset amount from a design plane according to the operation contents (for example, the operating amount and the operating direction) of the remote control signal (operation input) for which the boom 4 is designated as an operational object. Hereinafter, when the master control function is activated, a response of the controller 30 when a remote control signal for a slave element (slave actuator) is received is the same for the second through fifth examples that will be described.

In this case, based on the pressure value corresponding to the operated state of the lever device 26A input from the operating pressure sensor 29A, the controller 30 recognizes the operating direction and the operating amount, and sets the offset amount from the design plane according to the operating direction and the operating amount. When the operating device 26 is an electronic device as will be described, the controller 30 determines the operating amount and the operating direction based on an electronic signal input from the lever device 26A and sets the offset amount from the design plane in the same way. For example, when the lever 26R is operated (tilted) forward from the neutral state, the controller 30 causes the design plane to be offset in one predetermined direction, and when the lever 26R is operated (tilted) backward from the neutral state, the design plane is offset in another direction reverse to the predetermined direction. The controller 30 increases the offset amount as the operating amount of the lever device 26A increases. The controller 30 automatically controls operation of the boom 4 according to an operation of the lever device 26B in such a manner that the tip of the bucket 6 moves along the offset plane that is offset from the design plane by the set offset amount.

When the operating device 26 is an electronic device as will be described, the controller 30 can understand the operating amount and the operating direction based on an electronic signal input from the lever device 26A and operate an operational object that is different from operation of the slave actuator in the same way. The same applies to the second through fifth examples that will be described.

Because work is not always carried out on the same design plane in actual work sites, the operator needs to proceed with the work while appropriately changing the design plane. In this regard, in the present example, the operator can offset the design plane simply by operating the lever device 26A. Thus, for example, the operator can improve the work efficiency or achieve stress-free operation by avoiding re-setting of the design plane from a display screen page of the display device 40 in the cabin 10.

For example, when the height difference between the ground and a target construction plane with regard to actual construction is relatively great, if the construction surface is set as a design plane, the bucket 6 may not be able to reach the design plane at once, and the machine control function may not work well. In such a case, it is necessary to proceed ground digging work little by little while appropriately setting the design plane at a relatively shallow position from the ground. In this regard, in the present example, the offset amount can be adjusted appropriately through operation of the lever device 26A, so that the operator need not set the design plane from an operating screen page of the display device 40 each time, thereby improving the efficiency of operation or achieving alleviation of operator's stress.

Example 2 of Operational Object Allocating Method

Figures 9A, 9B:
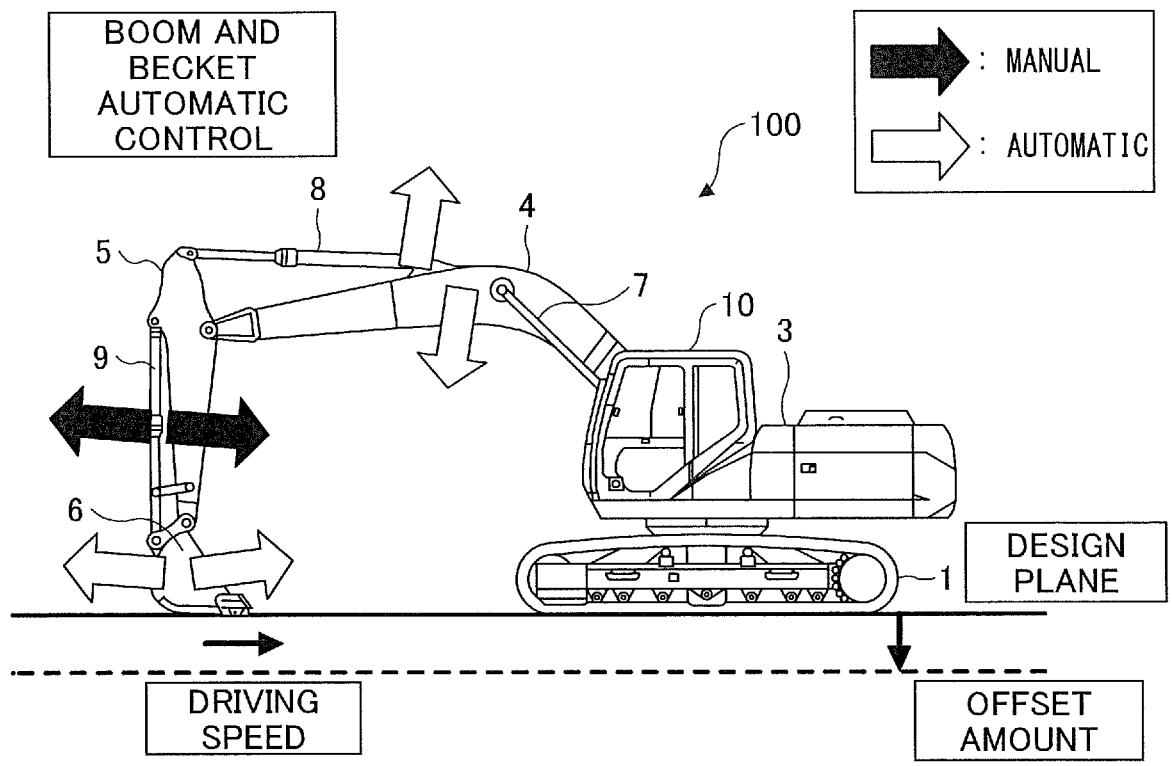
FIG. 9A is a diagram for illustrating a second example of a working state of the excavator with the machine control function.
FIG. 9B is a diagram for illustrating the second example of an allocation of a different operational object to a lever device corresponding to an actuator not required to be manually operated when the machine control function is activated.

FIG. 9 (FIGS. 9A and 9B) depicts a second example of a method of allocating a different operational object to a lever device corresponding to an actuator not required to be manually operated when the machine control function is activated. Specifically, FIG. 9A is a diagram for illustrating the second example of a working state of the excavator 100 using the machine control function. FIG. 9B depicts the second example of allocation of a different operational object to a lever device corresponding to an actuator not required to be manually operated when the machine control function is activated.

As depicted in FIG. 9A, in the present example, the excavator 100 automatically drives the boom 4 and the bucket 6 according to an opening or closing operation of the arm 5 performed on the lever device 26B by the machine control function, and performs excavation and leveling operations. That is, in the example, a master element and a master actuator are the arms 5 and the arm cylinder 8, respectively, and slave elements and slave actuators are the boom 4 and the buckets 6, and the boom cylinder 7 and the bucket cylinder 9, respectively.

In the present example, when the machine control function is activated, manual operation of the boom 4 and the bucket 6 using the lever devices 26A and 26C is not required. Therefore, the controller 30 deactivates operation of the boom 4 and the bucket 6 using the lever devices 26A and 26C. Specifically, as described above, changeover valves are provided that allow hydraulic oil on the secondary sides of the pilot lines of the lever devices 26A and 26C (examples of other lever devices) to be discharged to the hydraulic oil tank. This allows the controller 30 to control the changeover valves in such a manner that the pilot pressures from the lever devices 26A and 26C are prevented from being applied to the control valves 175 and 174 through the shuttle valves 32AL, 32AR, 32CL and 32CR. The same will apply to the example of FIG. 10A.

As depicted in FIG. 9B, the controller 30 allocates operational objects different from operation of the boom 4 and the bucket 6 respectively to the lever devices 26A and 26C that are for individually controlling the boom 4 (boom cylinder 7) and the bucket 6 (bucket cylinder 9) and are not required to be manually operated when the machine control function is activated. Specifically, as an operational object of forward/backward operation of the right-hand lever 26R corresponding to the lever device 26A, setting of an offset amount from a design plane is allocated as in the example of FIG. 8B. Setting of a driving (movement) speed (an example of a parameter) of the bucket 6 is allocated as an operational object of rightward/leftward operation of the right-hand lever 26R corresponding to the lever device 26C.

In this case, similarly to the example of FIG. 8B, the controller 30 recognizes the operating direction and the operating amount based on the pressure value corresponding to the operated state of the lever device 26A input from the operating pressure sensor 29A and sets the offset amount from the design plane according to the operating direction and the operating amount. The controller 30 recognizes the operating direction and the operating amount based on the pressure value corresponding to the operated state of the lever device 26C, which is input from the operating pressure sensor 29C, and sets the driving speed of the bucket 6 according to the operating direction and the operating amount. For example, when the lever 26R is operated (tilted) from the neutral state to the left, the controller 30 reduces the driving speed according to the operating amount compared to a predetermined default value, and when the lever 26R is operated (tilted) from the neutral state to the right, the controller 30 increases the driving speed according to the operating amount compared to the default value. The controller 30 automatically controls operation of the boom 4 and the bucket 6 according to operation of the lever device 26B in such a manner that the tip of the bucket 6 moves at the set driving speed along the offset plane offset from the design plane by the set offset amount. In this case, the controller 30 measures the actual movement speed of the bucket 6 based on information input from the boom angle sensor S1, the arm angle sensor S2, the bucket angle sensor S3, the body tilt sensor S4, the swiveled state sensor S5, the image capturing devices S6, or the like. The controller 30 controls the boom cylinder 7 and the arm cylinder 8 through the proportional valves 31AL, 31AR, 31BL, and 31BR so that the difference between the measured value of the actual movement speed of the bucket 6 and the set driving speed can be made smaller (zero).

In actual workplaces, a design plane may be approximately a vertical plane instead of a horizontal plane. In this case, the driving speed of the bucket 6 when the bucket 6 is moved along the design plane depends on the speed of lifting or lowering the boom 4. However, by operating the lever device 26B, only the driving speed of the arm 5 can be adjusted. Therefore, the movement of the boom 4 cannot be appropriately controlled with respect to operation of the lever device 26B, and the operation efficiency may be reduced. On the other hand, in the present example, the driving speed of the bucket 6 can be set appropriately by an operation of the lever device 26C. Thereby, the boom 4 and the bucket 6 are automatically controlled as being triggered by operation of the lever device 26B, and also, the boom 4 and the arm 5 are automatically controlled so that the bucket 6 moves at the set driving speed. Thus, the excavator 100 can drive the bucket 6 at an appropriate driving speed, to improve work efficiency.

Driving force (an example of a parameter) of the bucket 6, that is, setting of force which the bucket 6 apply to the ground, may be allocated as an operational object of either a forward/backward operation or leftward/rightward operation of the lever 26R corresponding to the lever devices 26A and 26C. In this case, the controller 30 recognizes the operating direction and the operating amount based on the pressure value corresponding to the operated state of any one of the lever devices 26A and 26C input from the corresponding one of the operating pressure sensors 29A and 29C, and sets the driving force of the bucket 6 according to the operating direction and the operating amount. For example, when the lever 26R is operated (tilted) in one direction (for example, backward or leftward) from the neutral state, the controller 30 reduces the driving force according to the operating amount compared to a predetermined default value, and when the lever 26R is operated (tilted) in the opposite direction (for example, forward or rightward), the driving force increases according to the operating amount compared to the default value. The controller 30 automatically controls operation of the boom 4 and the bucket 6 according to an operation of the lever device 26B in such a manner that the set driving force is applied to the ground. In this case, the controller 30 determines the attitude state of the excavator 100 (attachments) based on information input from the boom angle sensor S1, the arm angle sensor S2, the bucket angle sensor S3, the body tilt sensor S4, the swiveled state sensor S5, the image capturing devices S6, or the like. The controller 30 measures the actual driving force of the bucket 6 based on the information input from the boom rod pressure sensor S7R, the boom bottom pressure sensor S7B, the arm rod pressure sensor S8R, the arm bottom pressure sensor S8B, the bucket rod pressure sensor S9R, and the bucket bottom pressure sensor S9B, and the attitude state of the excavator 100. The controller 30 controls the boom cylinder 7, the arm cylinder 8, and the bucket cylinder 9 through the proportional valves 31AL, 31AR, 31BL, 31BR, 31CL, and 31CR so as to reduce the difference between the measured value of the actual driving force of the bucket 6 and the set driving force into zero.

As mentioned above, in a case where the height difference between the ground and the design plane is relatively great, the driving force may be insufficient, causing the bucket 6 to fail to reach the design plane at once, and causing the machine control function to fail to work properly. In this regard, in the present example, the driving force of the bucket 6 may be appropriately set by operation of any one of the lever devices 26A and 26C. Thus, automatic control of the boom 4 and the bucket 6 is performed as a result of being triggered by operation of the lever device 26B, and also, the boom 4, the arm 5, and the bucket 6 are automatically controlled in such a manner that the set driving force can be applied to the ground by the bucket 6. Thus, the excavator 100 can drive the attachments in such a manner that the appropriate driving force 6 can be applied to the ground, and improve the operational efficiency.

The controller 30 may control the output (speed) of the engine 11 or the discharge of the main pump 14 (at least one of the main pumps 14L and 14R) in order to implement the set driving speed or driving power of the bucket 6. That is, the controller 30 may automatically increase the output (speed) of the engine 11 or increase the discharge of the main pump 14 when it is determined that the speed of the engine 11 or the discharge of the main pump 14 set from other conditions is insufficient for implementing the set driving speed or driving power of the bucket 6. Accordingly, even when the output of the engine 11 or the main pump 14 is insufficient due to other conditions, the controller 30 may control the output of the engine 11 or the main pump 14 and appropriately implement the set driving speed or driving force of the bucket 6 according to the operated state of the lever device 26A or 26C.

Example 3 of Operational Object Allocating Method

Figures 10A, 10B:
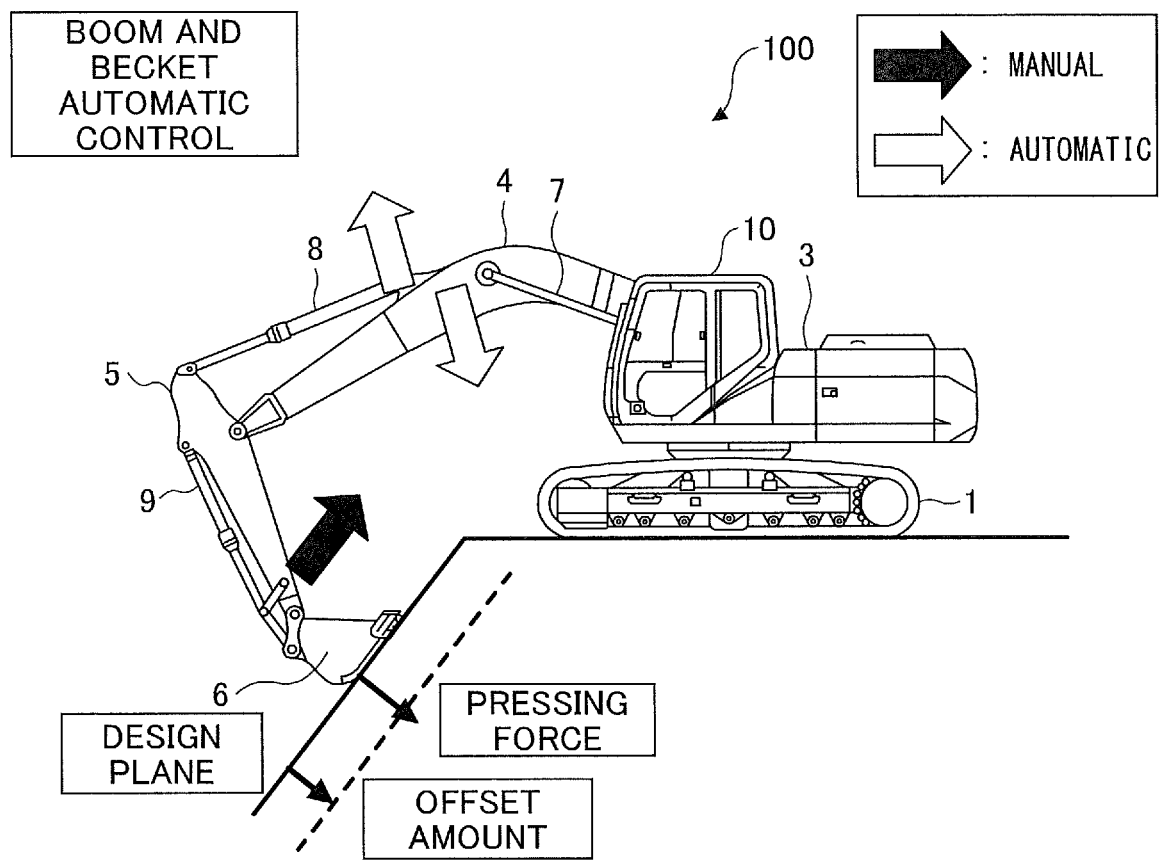
FIG. 10A is a diagram for illustrating a third example of a working state of the excavator with the machine control function.
FIG. 10B is a diagram for illustrating the third example of an allocation of a different operational object to a lever device corresponding to an actuator not required to be manually operated when the machine control function is activated.

FIG. 10 (FIGS. 10A and 10B) depicts a third example of a method of allocating a different operational object to a lever device corresponding to an actuator not required to be manually operated when the machine control function is activated. Specifically, FIG. 10A is a diagram for illustrating the third example of a working state of the excavator 100 using the machine control function. FIG. 10B depicts the third example of allocation of a different operational object to a lever device corresponding to an actuator not required to be manually operated when the machine control function is activated.

As depicted in FIG. 10A, in the present example, by the machine control function, the excavator 100 automatically drives the boom 4 and the bucket 6 according to an arm closing operation performed on the lever device 26B, to roll a forward-descending slope (a slope finishing work). That is, in the example, a master element and a master actuator are the arm 5 and the arm cylinder 8, respectively, and a slave element and a slave actuator are the boom 4 and the boom cylinder 7, respectively.

In the present example, as in the case of FIG. 9A, when the machine control function is activated, no operation using the lever devices 26A and 26C is required with respect to the boom 4 and the bucket 6. Therefore, the controller 30 deactivates operation of the boom 4 and the bucket 6.

As depicted in FIG. 10B, when the machine control function is activated, the controller 30 allocates an operational object that is different from operation of the boom 4 and the bucket 6 to the lever devices 26A and 26C for individually operating the boom 4 (boom cylinder 7) and the bucket 6 (bucket cylinder 9), respectively. Specifically, as in the cases of FIGS. 8B and 9B, an offset amount from a design plane is allocated as an operational object of forward/backward operation of the right-hand lever 26R corresponding to the lever device 26A. In addition, setting of pressing force (hereinafter, referred to as "pressing force of the bucket 6") when pressing the ground surface with the back face of the bucket 6 (an example of a parameter) is allocated as an operational object of leftward/rightward operation of the right-hand side lever 26R corresponding to the lever device 26C.

In this case, as in the case of FIGS. 8B and 9B, the controller 30 recognizes the operating direction and the operating amount based on the pressure value corresponding to the operated state of the lever device 26A input from the operating pressure sensor 29A, and sets an amount of offset from a design plane according to the operating direction and the operating amount. The controller 30 recognizes the operating direction and the operating amount based on the pressure value corresponding to the operated state of the lever device 26C, which is input from the operating pressure sensor 29C, and sets the pressing force of the bucket 6 according to the operating direction and the operating amount. For example, when the lever 26R is operated (tilted) from a neutral state to the left, the controller 30 reduces the pressing force according to the operating amount with respect to a predetermined default value, and when the lever 26R is operated (tilted) from the neutral state to the right, the controller 30 increases the pressing force according to the operating amount with respect to the default value. The controller 30 automatically controls operation of the boom 4 and the bucket 6 according to operation of the lever device 26B in such a manner that the back face of the bucket 6 can roll the ground along an offset plane offset from a design plane by a set amount of offset. In this case, the controller 30 recognizes the attitude state of the excavator 100 (attachments) based on information input from the boom angle sensor S1, the arm angle sensor S2, the bucket angle sensor S3, the body tilt sensor S4, the swiveled state sensor S5, the image capturing devices S6, or the like. The controller 30 measures the actual pressing force of the bucket 6 based on the information input from the boom rod pressure sensor S7R, the boom bottom pressure sensor S7B, the arm rod pressure sensor S8R, the arm bottom pressure sensor S8B, the bucket rod pressure sensor S9R, and the bucket bottom pressure sensor S9B, as well as the attitude state of the excavator 100. The controller 30 controls the boom cylinder 7, the arm cylinder 8, and the bucket cylinder 9 through the proportional valves 31AL, 31AR, 31BL, 31BR, 31CL, and 31CR to minimize (into zero) the difference between the measured value of the actual pressing force of the bucket 6 and the set pressing force.

For a slope finishing work, a certain amount of rolling pressure (pressing force) is to be applied to the ground. Normally, however, automatic control of the boom 4 and the bucket 6 is performed in such a manner that the tip (back face) of the bucket 6 moves along the design plane. Therefore, there is a possibility that the bucket 6 cannot apply sufficient rolling pressure (pressing force) to the slope corresponding to the design plane. In this regard, in the present example, the pressing force of the bucket 6 can be set appropriately through operation of the lever device 26C. As a result, automatic control of the boom 4 and the bucket 6 is performed as a result of being triggered by operation of the lever device 26B, and also, the boom 4 or the like is automatically controlled in such a manner that a set pressing force is generated. Accordingly, the excavator 100 can drive the attachment (boom 4) in such a manner that an appropriate rolling pressure can be applied to the ground by the bucket 6, allowing appropriate rolling operation (slope finishing operations) to be implemented.

Thus, in the present example, the controller 30 allocates an operational object that is different from operation of the boom 4 or the bucket 6, which is the original operational object, to a lever device corresponding to an actuator (a slave actuator) that is not required to be manually operated when the machine control function is activated. In other words, the lever devices 26A and 26C for operating the boom 4 and the bucket 6 individually among the lever devices 26A-26C receive operation inputs for predetermined operational objects different from operation of the boom 4 and the arm 5 when the machine control function is activated. Specifically, the controller 30 allocates setting of a parameter related to the machine control function to be an operational object of a lever device corresponding to an actuator that is not required to be manually operated when the machine control function is activated. Accordingly, in the excavator 100, it is possible to improve the efficiency of work and reduce stress of the operator.

[Specific Example of Operational Object Allocation Process]

Next, with reference to FIG. 11, a process regarding allocation of a different operational object to a lever device corresponding to an actuator not required to be manually operated when the machine control function is activated by the controller 30 (hereinafter referred to as "operational object allocation process") will be described.

Figure 11:
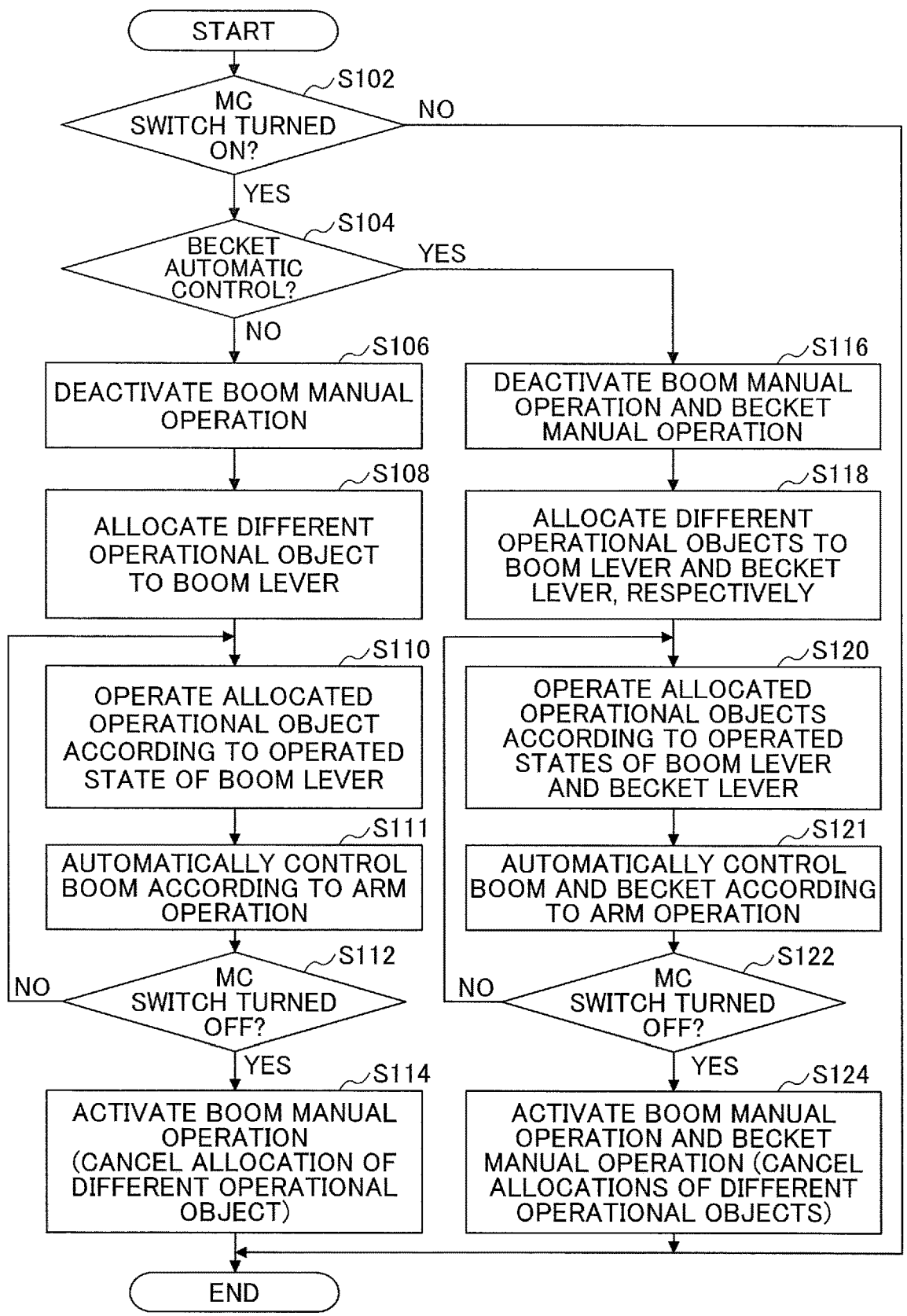
FIG. 11 is a flowchart for schematically illustrating an example of processing by a controller concerning an allocation of an operational object to a lever device corresponding to an actuator not required to be manually operated when the machine control function is activated.

FIG. 11 is a flowchart for schematically illustrating an example of an operational object allocation process by the controller 30. The flowchart is executed at predetermined processing intervals, for example, during operation from start to stop of the excavator 100.

In step S102, the controller 30 determines whether the MC switch is turned ON. When the MC switch is turned ON, the controller 30 proceeds to step S104. Otherwise, the process ends.

In step S104, the controller 30 determines whether the bucket 6 is to be automatically controlled in the machine control function initiated by the turning on of the MC switch. For example, whether the bucket 6 is to be automatically controlled may be determined as a result of being previously set by the operator or the like from a predetermined operating screen page displayed on a display device in the cabin 10, which is then read. Whether the bucket 6 is to be automatically controlled may be determined by determining whether the MC switch for automatically controlling only the boom 4 is turned on or determining whether the MC switch for automatically controlling both the boom 4 and the bucket 6 is turned on. Whether the bucket 6 is to be automatically controlled may be determined according to a mode of a turning-on operation of the MC switch. For example, it can be determined that only the boom 4 is to be automatically controlled in a case where a normal pressing operation is performed on the MC switch. It can be determined that both the boom 4 and the bucket 6 are to be automatically controlled in a case where a long pressing operation is performed on the MC switch. When the bucket 6 is not to be automatically controlled, the controller 30 proceeds to step S106, and when the bucket 6 is to be automatically controlled, the controller 30 proceeds to step S116.

In step S106, the controller 30 deactivates operation of the boom 4 performed on the lever device 26A as described above.

In step S108, the controller 30 allocates a different operational object to the lever device 26A whose operational object is originally operation of the boom 4. The operational object to be thus allocated may be predetermined by, for example, a setting operation by the operator or the like from a predetermined operating screen page displayed on the display device in the cabin 10. The operational object to be thus allocated may be determined automatically, for example, according to the work contents of the excavator 100. Specifically, in a case where the work contents are excavation or leveling work, the controller 30 may allocate setting of a driving speed and a driving force of the bucket 6 as the operational object, and may allocate setting of a pressing force of the bucket 6 as the operational object in a case where the work contents are rolling work. The same will apply to step S118.

In step S110, the controller 30 sets the operational object allocated to the lever device 26A, specifically the parameter related to the machine control function, according to the operated state (the operating direction and the operating amount) of the lever device 26A.

In step S111, the controller 30 performs automatic control of the boom 4 according to the operator's operation of the arm 5 performed on the lever device 26B based on the set state of the parameter related to the machine control functions set in step S110.

In step S112, the controller 30 determines whether the MC switch is turned off. When the MC switch is not turned off, the controller 30 returns to step S110 and repeats steps S110 and S111. When the MC switch is turned off, the controller 30 proceeds to step S114.

In step S114, the controller 30 activates operation of the boom 4 performed on the lever device 26A, cancels the allocation of the different operational object to the lever device 26A, and ends the process.

In step S116, the controller 30 deactivates operation of the boom 4 and bucket 6 performed on the lever device 26A and the lever device 26C as described above.

In step S118, the controller 30 allocates different operational objects to the lever devices 26A and 26C whose original operational objects are operations of the boom 4 and the bucket 6.

In step S120, the controller 30 performs operations of the operational objects allocated to the lever devices 26A and 26C, specifically, the controller 30 sets the parameters related to the machine control function, according to the operated states (the operating directions and the operating amounts) with respect to the lever devices 26A and 26C.

In step S121, the controller 30 performs automatic control of the boom 4 and the bucket 6 in response to the operator's operation of the arm 5 performed on the lever device 26B, based on the parameters related to the machine control function set in step S120.

In step S122, the controller 30 determines whether the MC switch is turned off. When the MC switch is not turned off, the controller 30 returns to step S120 and repeats steps S120 and S121. When the MC switch is turned off, the controller 30 proceeds to step S124.

In step S124, the controller 30 activates operations of the boom 4 and the bucket 6 performed on the lever devices 26A and 26C, cancels the allocations of different operational objects to the lever devices 26A and 26C, and ends the process.

[Other Examples of Operational Object Allocating Method]

Referring now to FIGS. 12-15, other examples (a fourth example and a fifth example) of a method of allocating a different operational object to a lever device corresponding to an actuator not required to be manually operated when the machine control function is activated will now be described.

Example 4 of Operational Object Allocating Method

Figure 13B:
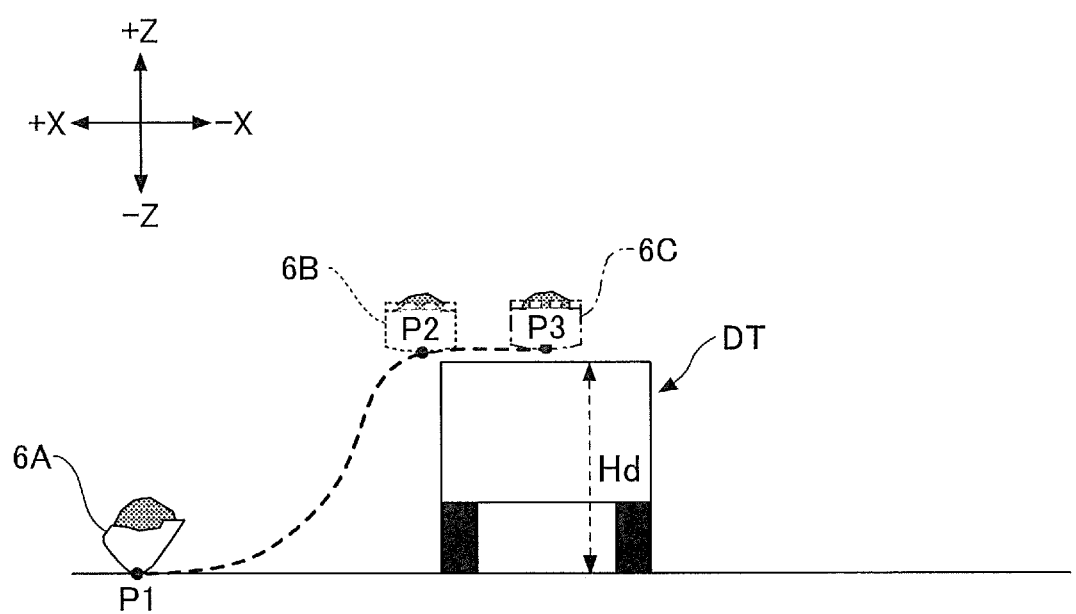
FIG. 13B is a diagram for illustrating the fourth example of a working state of the excavator with the machine control function.

First, FIG. 12 and FIG. 13 (FIGS. 13A and 13B) depict the fourth example of a method for allocating a different operational object to a lever device corresponding to an actuator not required to be manually operated when the machine control function is activated. Specifically, FIG. 12 is a diagram for illustrating the fourth example of allocation of a different operational object to a lever device corresponding to an actuator not required to be manually operated when the machine control function is activated. FIGS. 13A and 13B depict the fourth example of a working state of the excavator 100 using the machine control function.

Note that in FIGS. 13A and 13B, for convenience, the bucket 6 at positions P1-P3 is expressed separately as buckets 6A-6C, respectively.

As depicted in FIG. 12, in the present example, as in the above-described first through third examples, when the machine control function is activated, the arm 5 (master element) is driven to open or close according to an operation of the lever device 26B (that is, the operation to operate the arm 5), and the boom 4 follows (moves together with) the operation of the arm 5. This allows movement of a working portion of the bucket 6 (for example, the tooth tip, the back face, or the like) along a design plane in response to a closing operation of the arm 5.

In the present example, when the machine control function is activated, the upper swiveling body 3 (master element) is driven to swivel according to an operation of the lever device 26D (that is, the operation to operate the upper swiveling body 3), and the boom 4 (slave element) follows (moves together with) the operation of the upper swiveling body 3 to move in a lifting direction. Thus, through an operation of the lever device 26D, a boom lifting and swiveling operation is implemented along a target track. The same applies to a case of remote control.

In the present example, when the machine control function is activated, the bucket 6 (master element) is driven to open or close according to an operation of the lever device 26C (that is, the operation to operate the bucket 6), and the arm 5 follows (moves together with) the operation of the bucket 6 to operate in an opening direction. Accordingly, through an operation of the lever device 26C, an earth discharge operation (dumping operation) along a target track is implemented.

In the present example, in a case where the lever 26L (lever devices 26B and 26D) is operated when the machine control function is activated, no operation on the lever device 26A is required with respect to the boom 4. Therefore, in this case, the controller 30 deactivates manual operation of the boom 4. The controller 30 allocates an operational object that is different from operation of the boom 4 to the lever device 26A corresponding to the boom 4 (boom cylinder 7) not required to be manually operated. Specifically, adjustment of a parameter concerning operation of a working portion of the bucket 6 is allocated as an operational object to operation of the right-hand lever 26R corresponding to the lever device 26A. In this case, adjustment of a parameter concerning operation may include adjustment of a position (height), a speed, an acceleration, or the like. The same applies to the fifth example that will be described. Thus, operation of a working portion of the bucket 6 with respect to the machine control function can be adjusted by operating the lever 26R in a forward or backward direction upon operating the lever 26L (i.e., the lever devices 26B and 26D).

As depicted in FIGS. 13A and 13B, in the present example, the excavator 100 uses the machine control function to collect earth into a dump truck DT.

The operator operates the arm 5 in a closing direction through the lever device 26B. As a result, the arm 5 is driven to open, and at the same time, the boom 4 follows the operation of the arm 5 to move upward, so that earth is collected into the bucket 6 near the ground (position P1, bucket 6A).

The operator then operates the lever device 26D to cause swiveling in the right direction. As a result, the upper swiveling body 3 is driven to swivel to the right, and the boom 4 follows the swiveling operation to move upward, thus implementing a boom lifting and swiveling operation (the broken line from the bucket 6A of the position P1 to the bucket 6B of the position P2). At this time, the operator can adjust the position (height) and speed of the bucket 6 by operating the lever device 26A while operating the lever device 26D.

When the bucket 6 arrives at the loading platform of the dump truck DT, the operator operates the lever device 26C in the bucket 6 opening direction while returning the lever device 26D to the neutral position, thereby allowing the arm 5 to follow the operation of the bucket 6 to operate in the opening direction, thereby implementing an earth discharge operation (the broken line from the bucket 6B at the position P2 to the bucket 6C at the position P3).

As described above, in the present embodiment, the series of operations of collecting earth into the bucket 6, lifting and swiveling the boom, and discharging the earth can be implemented by operation of the only one lever device, that is, the only one operation input. The operator can adjust a boom lifting and swiveling operation of the bucket 6 using an operation input corresponding to operation of the boom 4 which is not required to be manually operated. This further improves operator's operability.

Example 5 of Operational Object Allocating Method

FIGS. 14 and 15 are diagrams for illustrating a fifth example of a method for allocating a different operational object to a lever device corresponding to an actuator not required to be manually operated when the machine control function is activated. Specifically, FIG. 14 is a diagram for illustrating the fifth example of allocation of a different operational object to a lever device corresponding to an actuator not required to be manually operated when the machine control function is activated. FIG. 15 is a diagram for illustrating the fifth example of a working state of the excavator 100 using the machine control function.

As depicted in FIG. 14, in the present example, when the machine control function is activated, the arm 5 (master element) is driven to open and the bucket 6 (slave element) follows the operation of the arm 5 to open, in response to a forward operation (i.e., to open the arm 5) of the lever device 26B (i.e., the lever 26L). In addition, the boom 4 (slave element) may also follow the operation of the arm 5 to operate downward. This results in implementation of an earth discharge operation through the forward operation of the lever device 26B.

In the present example, when the machine control function is activated, the arm 5 (master element) is driven to close and the boom 4 (slave element) follows (operates together with) the operation of the arm 5, in response to a backward operation of the lever device 26B (i.e., the lever 26L) (i.e., a closing operation of the arm 5). This allows a movement of the working portion of the bucket 6 (for example, the tooth tip, the back face, or the like) along a design plane, through the backward operation of the lever device 26B.

In the present example, when the machine control function is activated, the upper swiveling body 3 (master element) is driven to swivel leftward and the boom 4 follows (operates together with) the operation of the upper swiveling body 3 to operate upward, in response to a leftward operation of the lever device 26D (i.e., the lever 26L) (i.e., a leftward swiveling operation). Accordingly, a boom lifting and swiveling operation along a target track is implemented through a leftward operation of the lever device 26D.

In the present example, when the machine control function is activated, the upper swiveling body 3 (master element) is driven to swivel rightward and the boom 4 follows (operates together with) the operation of the upper swiveling body 3 to operate downward, in response to a rightward operation of the lever device 26D (that is, the lever 26L) (that is, a rightward swiveling operation). Accordingly, a boom lowering and swiveling operation along a target track is implemented through a rightward operation of the lever device 26D.

In the present example, when the lever 26L (i.e., the lever device 26B) is operated backward in a case where the machine control function is activated, operation of the boom 4 through the lever device 26A is not required. In addition, when the lever 26L (that is, the lever device 26B) is operated in the forward direction, operation of the boom 4 can be considered unnecessary because an earth discharge operation is performed. Accordingly, in this case, the controller 30 deactivates manual operation of the boom 4. The controller 30 allocates an operational object that is different from operation of the boom 4 to the lever device 26A corresponding to the boom 4 (boom cylinder 7) thus not required to be manually operated. Specifically, adjustment of a parameter concerning operation of (a working portion of) the bucket 6 when the arm 5 is driven is allocated as an operational object of forward/backward operation of the right-hand lever 26R corresponding to the lever device 26A. This allows operation of (the working portion of) the bucket 6 through the machine control function to be adjusted through a forward/backward operation of the lever 26R performed when a forward/backward operation of the lever 26L (i.e., the lever device 26B) is performed.

Also, in the present example, when the lever 26L (i.e., the lever device 26D) is operated in a case where the machine control function is activated, it can be considered unnecessary to operate the bucket 6 through the lever device 26A. This is because, in a boom lifting and swiveling operation and a boom lowering and swiveling operation, the attitude of the bucket 6 is kept constant. Therefore, in this case, the controller 30 deactivates manual operation of the bucket 6. The controller 30 allocates an operational object that is different from operation of the bucket 6 to the lever device 26C corresponding to the bucket 6 (the bucket cylinder 9) not required to be manually operated. Specifically, adjustment of a parameter concerning operation of (a working portion of) the bucket 6 when the upper swiveling body 3 is driven is allocated as an operational object of rightward/leftward operation of the right-hand lever 26R corresponding to the lever device 26C. Thus, operation of (the working portion of) the bucket 6 through the machine control function can be adjusted through a forward/backward operation of the lever 26R performed when a rightward/leftward operation of the lever 26L (i.e., the lever device 26D) is performed.

As depicted in FIG. 15, in the present example, the excavator 100 repeatedly performs an operation pattern sequence of an excavation operation (working states 15A-15D), a boom lifting and swiveling operation (working state 15E), a dumping operation (working state 15F), and a boom lowering and swiveling operation using the machine control function.

The operator operates the lever device 26B (i.e., a backward direction) to operate the arm 5 in a closing direction. As a result, the excavator 100 can implement an excavation operation in which the arm 5 is driven in a closing direction and the boom 4 follows (operates together with) the operation of the arm 5 appropriately, and a working portion (for example, the tooth tip) of the bucket 6 moves along a target track (for example, an offset plane with respect to a design plane or the design plane) (working states 15A-15C). Then, the excavator 100 collects the earth excavated through the excavation operation into the bucket 6 (working state 15D). At this time, the operator can operate the lever device 26A forward or backward while operating the lever device 26B, to adjust the movement speed of the bucket 6, for example.

The operator then operates the lever device 26D (i.e., operates the lever device 26D leftward) to cause a leftward swiveling operation. As a result, the excavator 100 performs a boom lifting and swiveling operation in which the upper swiveling body 3 is driven to swivel leftward, the boom 4 follows (operates together with) the operation of the upper swiveling operation to move upward, and a working portion of the bucket 6 moves along a target track (working state 15E). At this time, the operator can adjust the position (height) or movement speed of the bucket 6 by operating the lever device 26C rightward or leftward while operating the lever device 26D.

The operator then operates the arm 5 in an opening direction through the lever device 26B (i.e., a forward operation of the lever device 26B). As a result, in the excavator 100, the arm 5 is drive to open, and the bucket 6 follows (operates together with) the operation of the arm 5 to open, thereby an earth discharge operation (dumping operation) in which a working portion of the bucket 6 moves along a target track (working state 15F) being implemented. At this time, the operator can adjust the position or speed of the bucket 6 by operating the lever device 26A forward or backward while operating the lever device 26B.

The operator then causes a rightward swiveling operation through (a rightward operation of) the lever device 26D. As a result, the excavator 100 can implement a boom lowering and swiveling operation in which the upper swiveling body 3 is driven to swivel rightward, the boom 4 follows (operates together with) the operation of the upper swiveling body 3 to move downward, and a working portion of the bucket 6 moves along a target track (working state 15G). At this time, the operator can adjust the position (height) or movement speed of the bucket 6 by operating the lever device 26C rightward or leftward while operating the lever device 26D.

Thus, in the present example, a series of works, i.e., an excavation operation, a boom lifting and swiveling operation, a dumping operation, and a boom lowering and swiveling operation can be implemented only through an operation of left-handed lever 26L. The operator can also adjust operation of the bucket 6 by using an operation input corresponding to operation of the boom 4 not required to be manually operated, when performing a forward/backward operation of the left-hand lever 26L. The operator may also use an operation input corresponding to operation of the bucket 6 not required to be manually operated, to adjust a parameter of operation of the bucket 6, when performing a rightward/leftward operation of the left-side lever 26L. This further improves operator's operability and convenience.

Advantageous Effects of the Present Embodiment

Next, the advantageous effects of the present embodiment will be described.

In the present embodiment, the excavator 100 includes a plurality of actuators (hydraulic actuators) and an operation receiving unit (operating device 26, communication device T1) that receives a plurality of operation inputs related to the plurality of actuators. The excavator 100 has a normal control mode in which one operation input of a plurality of operation inputs operates an actuator of the plurality of actuators, and a machine control mode in which two or more actuators of the plurality of actuators operate by the one operation input. Then, under the control of the controller 30, when the excavator 100 is in the machine control mode, the excavator 100 adjusts a parameter concerning an actuator operated by the one operation input among the plurality of actuators, in response to another operation input different from the one operation input among the plurality of operation inputs. Alternatively, another actuator different from the two or more actuators that operate by the one operation input may be operated in response to the another operation input, instead parameter adjustment. That is, the another actuator different from the two or more actuators that operate by the one operation input may be allocated as an operational object of the another operation input (for example, a lever device corresponding to an actuator not required to be manually operated when the machine control function is activated).

Specifically, in the present embodiment, in the machine control mode, the controller 30 implements a function (the machine control function) of, in response to one operation input, automatically controlling operations of two or more actuators including one actuator that is an operational object of the one operation input in the normal control mode, in such a manner that a predetermined working portion (for example, the tooth tip of the bucket 6) performs a predetermined operation (for example, moves along a target track). When the excavator 100 is in the machine control mode, under the control of the controller 30, according to another operation input that operates another actuator different from the one actuator among the two or more actuators in the normal control mode, the excavator 100 operates a predetermined operational object (for example, a parameter concerning the machine control function) different from operation of the another actuator.

This improves operator's operability and convenience.

Variants and Modifications

Thus, the work machines and information processing apparatuses have been described with reference to the illustrative embodiments. In this regard, the present invention is not limited to the specifically disclosed embodiments, and various modifications and/or changes may be made within the claimed scope.

For example, in the embodiments described above, the operating device 26 (lever devices 26A-26D) is of a hydraulic type that outputs a pilot pressure according to an operated state caused by the operator, but may be of an electrical type that outputs an electrical signal. In this case, also the pilot circuits for applying the pilot pressures to the control valves 171 to 173 corresponding to the traveling hydraulic motors 1L and 1R and the swiveling hydraulic motor 2A may be provided with proportional valves 31, as in FIGS. 4A to 4C. As a result, when the machine control function is deactivated, the controller 30 may control the proportional valves 31 in response to electrical signals from the operating device 26 to apply pilot pressures to the control valves 171-176 according to the operated states. When the machine control function is activated, the attachments or the like can be automatically controlled by appropriately controlling the proportional valves 31 independent of the electrical signals from the operating device 26 (such as the lever devices 26A and 26C). In this case, the control valves 171-176 of the control valves 17 may also be replaced by solenoid pilot control valves driven by electrical signals according to the operated states input from the operating device 26. The machine control function can then be implemented by the controller 30 as a result of employing a configuration that allows control signals from the controller 30 to be input to electromagnetic pilot control valves in a manner of interrupting electrical signals from the operating device 26.

Further, in the above-described embodiments and variations, an operational object concerning the machine control function (specifically, setting of a parameter concerning the machine control function) is allocated to the lever device corresponding to an actuator which is not required to be manually operated when the machine control function is activated. In this regard, also any other type of operational object may be allocated. For example, for a lever device corresponding to an actuator not required to be manually operated when the machine control function is activated, setting for at least one of energy consumption and regeneration of excavator 100 such as the speed of the engine 11 as a power source having the constant speed; the output of the engine 11 (horsepower); the outputs of the main pumps 14; the output of an electric storage device (for example, lithium ion battery) or an external commercial power supply connected via a cable as a power source for when electric actuators are employed as will be described; regeneration of hydraulic oil during lowering operation of the boom 4 or closing operation of the arm 5; and regeneration (electric regeneration or hydraulic regeneration) in the upper swiveling body 3 when the swiveling speed is reduced; or the like, may be allocated as an operational object.

Also, in the embodiments and variations described above, the machine control function is applied to operation of attachments including the boom 4, the arm 5, and the bucket 6, but the present invention is not limited to these embodiments. For example, the machine control function may be applied to operation of an excavator 100 having attachments including a boom, a plurality of arms, and an end attachment. That is, the machine control function may be implemented by automatically controlling operations of other link units according to an operation of one link unit of attachments including a plurality of link units. In this case, when the machine control function is activated, operations of lever devices for operating the other link units are not required. Therefore, as described above, operational objects different from operations of the other link units may be allocated to the lever devices.

Also, although the above-described embodiments and variations are directed to the machine control functions with respect to the attachments of the excavator 100, the machine control function may be applied to attachments that include a plurality of links mounted to a body of another work machine. In this case, as described above, when the machine control function of the attachments of the another work machine is activated, an operational object different from operation of a link unit that is the original operational object may be allocated to a lever device corresponding to an actuator not required to be manually operated.

Also, in the above-described embodiments and variations, the machine control functions are applied to excavating work, rolling work, work to collect earth into a dump truck, and so forth, but may be applied to any other works or operations. For example, the machine control function may be applied to crane work of the excavator 100. In crane work, the bucket 6 is fully closed, a hook contained near a bucket link of the bucket 6 is taken out, a load is suspended by the hook, and the suspended load is moved by an operation of an attachment or a swiveling operation of the upper swiveling body 3. Specifically, the excavator 100 may, under the control of the controller 30, drive the arm 5 in response to an operation of the lever device 26B and cause the boom 4 to follow the operation of the arm 5 to operate in order to maintain the height of the suspended load or in order to move along a predetermined target track. In this case, as in the above-described embodiments and modifications, an operational object different from operation of the boom 4 may be allocated to the lever device 26A corresponding to the boom 4 not required to be manually operated when the machine control function is activated. For example, the machine control function may be applied to slope construction work performed while the lower traveling body 1 is moved in the slope extending direction. Specifically, in the slope construction work, the lower traveling body 1 is driven in the slope extending direction after construction at a certain working area is completed, and is moved to the next working area, and the construction work is repeated. At this time, the slope to be constructed may extend so as to draw a curve when viewed from the top view. In this case, when the lower traveling body 1 is driven in a linear manner, the mutually facing relationship between the upper swiveling body 3 and the slope is disrupted. Therefore, the excavator 100 may respond to the operator's swiveling operation with respect to the upper swiveling body 3 in such a manner as to drive the lower traveling body 1 (including left and right crawlers), and, in order to maintain the mutually facing relationship between an attachment (an example of a working portion) of the upper swiveling body 3 and the slope, causes a swiveling operation of the upper swiveling body 3 to follow the operation of the lower traveling body 1, under the control of the controller 30. In this case, as in the above-described embodiments and modifications, an operational object different from operation of the upper swiveling body 3 may be allocated to the lever device 26D corresponding to the upper swiveling body 3 (swiveling hydraulic motor 2A) not required to be manually operated when the machine control function is activated.

In the above-described embodiments and variations, when the machine control function is activated, an operational object different from an operational object of a link unit which is the original operational object of a lever device is allocated to the lever device corresponding to the actuator which is not required to be manually operated. However, the same type of allocation may be performed also when a fully automatic operation function (also referred to as an autonomous operation function) is activated. The fully automatic operation function is a function in which attachments and the upper swiveling body 3 operate without the operator's lever operation. In this case, because the operator's operation of the lever devices 26A-26D is not required, operational objects different from operations of the attachments and the upper swiveling body 3 (for example, settings of parameters concerning the fully automatic operation function) may be allocated to some or all of the lever devices 26A-26D.

In the above-described embodiments and variations, the excavator 100 is configured such that the various to-be-driven elements such as the lower traveling body 1, the upper swiveling body 3, the boom 4, the arm 5, and the bucket 6 are hydraulically driven, but some elements of the excavator 100 may be electrically driven by electric actuators (e.g., electric motors) (examples of an actuator). That is, the configurations disclosed in the above-described embodiments may be applied to a hybrid excavator, an electric excavator, or the like.

Further, in the above-described embodiments and modifications, when two or more actuators are operated in response to one operation input, the operator or the like may be allowed to select (set) an operational object from among a plurality of choices to be allocated to another operation input corresponding to a hydraulic actuator not required to be manually operated. In this case, an operating screen page (GUI) for selecting (setting) an operational object to be allocated to the another operation input from among a plurality of choices or for checking the set contents may be displayed on the display device 40. For example, in the fourth and fifth examples of the above-described method of allocating an operational object, a plurality of parameters such as a position, a speed, an acceleration, and so forth may be prepared as parameters concerning operation of a working portion of the bucket 6, and a parameter as an operational object may be selected from among the parameters through the operating screen page. Further, it may be possible to set an operational object to be allocated to the another operation input or to check the set contents thereof from an information processing apparatus external to the excavator 100. For example, the information processing apparatus may be a user terminal (for example, a portable terminal such as a smartphone, a tablet terminal, a laptop computer terminal, or a stationary terminal such as a desktop computer terminal) used by a user (an operator, an administrator, a service person, or the like) related to the excavator 100. As a result, the user can set an operational object to be allocated from the user terminal used by him/her to the another operation input corresponding to a slave actuator when the machine control function of the excavator 100 is activated, and check the set contents by displaying the operational object. In this case, the user terminal may be communicatively connected to the excavator 100 directly or via a management apparatus (server device) or the like. The user terminal may display an operating screen page similar to that of the display device 50 on a display device (display). Accordingly, the set contents that have been set from the operating screen page can be reflected to the controller 30 of the excavator 100 through communication between the excavator 100 and the user terminal. Further, the set contents that have been set in the excavator 100 are reflected to the user terminal through communication between the excavator 100 and the user terminal, and thus, the current set contents can be displayed on the operating screen page of the user terminal (display device). The information processing apparatus may be a management apparatus (server apparatus) capable of communicating with the excavator 100. Accordingly, the administrator of the management apparatus is able to manage (monitor) setting of an operational object to be allocated to the another operation input corresponding to a slave actuator when the machine control function of the excavator 100 is activated, and is able to manage (monitor) the set contents thereof. In this case, the management apparatus may be connected directly to the excavator 100 via a predetermined communication network. The management apparatus may display on its display device (display) an operating screen page similar to that of the display device 50. Thus, set contents that have been set from the operating screen page can be reflected to the controller 30 of the excavator 100 through communication between the excavator 100 and the management apparatus. In the same way, through communication between the excavator 100 and the management apparatus, the set contents that have been set in the excavator 100 are reflected to the management apparatus, and the current set contents can be displayed on the operating screen page of the management apparatus (the display device).

Further, in the above-described embodiments and variations, in the excavator 100, a plurality of hydraulic actuators operate in response to one operation input, but, also in another work machine, a plurality of hydraulic actuators may operate in response to one operation input. In this case, as in the above-described embodiments and modifications, the another work machine may adjust a parameter for two or more actuators operating by the one operation input or may operate an actuator different from the two or more actuators, according to another operation input different from the one operation input.

For example, a jib crane (one example of a work machine) includes a jib (one example of a supporting member), a wire hanging from the tip portion of the jib (one example of a supporting unit), and a hook attached to the tip of the wire. A jib undulating operation (i.e., a vertical movement of the tip portion of the jib) and a wire winding operation (winding up or winding down) are driven by actuators, respectively, such as hydraulic cylinders, hydraulic motors, electric motors, or the like.

In this regard, in a first mode corresponding to the normal control mode of the excavator 100, one actuator operates by one operation input. For example, a jib undulating operation is allocated to a first operation input as an operational object and a wire winding up/winding down operation is allocated to a second operation input.

In a second mode corresponding to the machine control mode of the excavator 100, a jib undulating operation and a wire winding up/winding down operation are performed simultaneously by one operation input. Specifically, in response to one operation input, a master element among the jib and the wire is operated, and a slave element among the jib and the wire operates together with the operation of the master element in such a manner that the hook as a working portion moves along a target track. Also, when the jib crane is of a swiveling type, an upper swiveling body may act as a master or a slave element and all of the jib, the wire, and the upper swiveling body may operate together. This allows the jib crane to move horizontally, for example, while the hook is maintained at substantially the same height. That is, the operator can move the load horizontally while keeping the height of the load suspended on the hook constant by operating only one operating unit (for example, a lever device) corresponding to one operation input. This improves operator's operability and convenience.

In this case, a manual operation of the slave element among manual operations of the jib (undulating operation) and wire (winding up or winding down operation) is not required. Therefore, to another operation input corresponding to one element not required to be manually operated among the jib and wire, that is, to another operation input having an operational object corresponding to that one element among the jib and wire in the first mode, an operational object that is different from operation of that one element not required to be manually operated is allocated. For example, adjustment of a parameter concerning movement of the hook as a working portion, such as the height position, the speed of movement, or the like, may be allocated. This further improves operator's operability and convenience.

As another example, a portal crane (one example of a work machine) includes a portal frame (one example of a supporting member), a trolley (one example of a supporting unit) mounted in a manner of being able to move in width directions on top of the portal frame, a wire suspended from the trolley, and a hook attached to the tip of the wire. Forward/backward operation of the portal frame, horizontal operation the trolley (in the width directions), and winding operation of the wire are driven by actuators such as hydraulic motors, electric motors, or the like.

In this regard, in a first mode corresponding to the normal mode of the excavator 100, one actuator operates by one operation input. For example, forward/backward operation of the portal frame is allocated to a first operation input as an operational object, horizontal operation of the trolley is allocated to a second operation input, and wire winding operation is allocated to a third operation input.

In a second mode corresponding to the machine control mode of the excavator 100, two or more of forward/backward operation of the portal frame, horizontal operation of the trolley, and winding operation of the wire are performed simultaneously by one operation input. Specifically, a master element among the portal frame, trolley, and wire is actuated, and slave elements among the portal frame, trolley, and wire operate together with the operation of the master element in such a manner that the hook as a working portion moves along a target track. This allows the operator to move a suspended load suspended on the hook along a desired target track by operating only one operating unit (for example, a lever device) corresponding to the one operation input. This improves operator's operability and convenience.

In this case, manual operations of the slave elements among the portal frame, trolley, and wire are not required. Therefore, to another operation input that has an operational object in the first mode which is one element among the jib and wire not required to be manually operated, an operational object different from operation of that one element not required to be manually operated is allocated. For example, adjustment of a parameter concerning operation of the hook as a working portion may be allocated, such as the speed of movement of the hook. This further improves operator's operability and convenience.

It should be understood that the invention is not limited to the above-described embodiments, but may be modified into various forms on the basis of the spirit of the invention. Additionally, the modifications are included in the scope of the invention.

What is claimed is:

1. A work machine, comprising:
a lower traveling body;
an upper swiveling body swivelably mounted to the lower traveling body;
an attachment mounted to the upper swiveling body, the attachment including a boom, an arm, and an end attachment;
a plurality of actuators including a swiveling motor configured to drive the upper swiveling body, a boom cylinder configured to drive the boom, an arm cylinder configured to drive the arm, and an end attachment cylinder configured to drive the end attachment; and
an operation receiving unit configured to receive a plurality of operation inputs concerning the plurality of actuators from a first operating lever configured to operate two of the swiveling motor, the boom cylinder, the arm cylinder, or the end attachment cylinder and a second operating lever configured to operate the other two of the swiveling motor, the boom cylinder, the arm cylinder, or the end attachment cylinder,
wherein
the work machine is configured to be controlled in a first mode in which a machine control function is deactivated and in a second mode in which a machine control function is activated, the machine control function being a function of causing one of the plurality of actuators to operate and causing at least another one of the plurality of actuators to automatically operate in response to an operation input for said one of the plurality of actuators,
the first operating lever is operated in a predetermined direction to
cause one of the two of the swiveling motor, the boom cylinder, the arm cylinder, or the end attachment cylinder to operate, when the work machine is controlled in the first mode, and
cause the one of the two of the swiveling motor, the boom cylinder, the arm cylinder, or the end attachment cylinder to operate and cause at least one of the other two of the swiveling motor, the boom cylinder, the arm cylinder, or the end attachment cylinder to automatically operate without an operation of the second operating lever, when the work machine is controlled in the second mode,
the second operating lever is operated in a predetermined direction to
cause one of the other two of the swiveling motor, the boom cylinder, the arm cylinder, or the end attachment cylinder to operate, when the work machine is controlled in the first mode, and
adjust a parameter of said one or the other one of the other two of the swiveling motor, the boom cylinder, the arm cylinder, or the end attachment cylinder or cause the other one of the other two of the swiveling motor, the boom cylinder, the arm cylinder, or the end attachment cylinder to operate, when the work machine is controlled in the second mode,
the first operating lever is configured to operate the arm cylinder and the swiveling motor,
the second operating lever is configured to operate the boom cylinder and the end attachment cylinder,
the attachment includes a bucket as the end attachment, and
the first operating lever is operated in the predetermined direction to cause the arm cylinder to operate and cause the at least one of the boom cylinder or the end attachment cylinder to automatically operate without the operation of the second operating lever such that a predetermined working portion of the bucket moves along a predetermined design plane, when the work machine is controlled in the second mode.

2. The work machine as claimed in claim 1, wherein the parameter includes at least one of an amount of offset from the predetermined design plane, force driving a tip portion of the bucket along the predetermined design plane, a speed of driving the tip portion of the bucket along the design plane, pressing force by the tip portion of the bucket against the design plane, and a parameter concerning an operation of the bucket.

3. An information processing apparatus for the work machine as set forth in claim 1, wherein
the information processing apparatus is configured to set the parameter or display set contents of the parameter.

* * * * *